(12) United States Patent
Kavanagh et al.

(10) Patent No.: US 10,152,240 B2
(45) Date of Patent: Dec. 11, 2018

(54) RESOURCE ALLOCATION BASED ON TRANSACTION PROCESSOR CLASSIFICATION

(71) Applicant: Chicago Mercantile Exchange Inc., Chicago, IL (US)

(72) Inventors: Kyle D. Kavanagh, Chicago, IL (US); José Antonio Acuña-Rohter, Chicago, IL (US); Viren Soni, Roselle, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 67 days.

(21) Appl. No.: 15/339,160

(22) Filed: Oct. 31, 2016

(65) Prior Publication Data
US 2018/0121103 A1 May 3, 2018

(51) Int. Cl.
| G06F 3/06 | (2006.01) |
| G06F 9/46 | (2006.01) |
| G06F 9/50 | (2006.01) |
| G06Q 40/04 | (2012.01) |
| H04L 12/927 | (2013.01) |

(52) U.S. Cl.
CPC ............ *G06F 3/0611* (2013.01); *G06F 3/067* (2013.01); *G06F 3/0631* (2013.01); *G06F 3/0635* (2013.01); *G06F 9/467* (2013.01); *G06F 9/5011* (2013.01); *G06Q 40/04* (2013.01); *H04L 47/805* (2013.01)

(58) Field of Classification Search
CPC ...... G06F 3/067; G06F 3/0631; G06F 3/0611; G06F 3/0635; G06F 9/467
USPC ........................................................ 711/170
See application file for complete search history.

(56) References Cited

U.S. PATENT DOCUMENTS

| 7,039,610 | B2 | 5/2006 | Morano et al. |
| 7,130,824 | B1 | 10/2006 | Amanat et al. |
| 7,831,491 | B2 | 11/2010 | Newell et al. |
| 7,853,499 | B2 | 12/2010 | Czupek et al. |
| 2005/0096999 | A1 | 5/2005 | Newell et al. |
| 2005/0203826 | A1 | 9/2005 | Farrell et al. |
| 2014/0006243 | A1 | 1/2014 | Boudreault et al. |

(Continued)

FOREIGN PATENT DOCUMENTS

WO WO2015077389 A1 5/2015

OTHER PUBLICATIONS

"How QoS Works", Microsoft, Mar. 28, 2003, 12 pages.
(Continued)

*Primary Examiner* — Jasmine Song
(74) *Attorney, Agent, or Firm* — Lempia Summerfield Katz LLC

(57) ABSTRACT

A data transaction processing system including multiple transaction processors also includes a resource allocation system that characterizes the transaction processors based on input output electronic data transaction request message patterns associated with the transaction processors. The resource allocation system dynamically allocates computing resources, such as data path bandwidth, processor priority, CPU cores, memory, and processing threads to the various transaction processors and components therein based upon the transaction processor characterizations, improving the overall processing throughput, resource utilization, and efficiency of the multi-transaction processor system.

10 Claims, 18 Drawing Sheets

(56) References Cited

U.S. PATENT DOCUMENTS

| | | | |
|---|---|---|---|
| 2014/0074691 A1* | 3/2014 | Bank | G06Q 20/3278 |
| | | | 705/39 |
| 2015/0073962 A1 | 3/2015 | Bixby et al. | |
| 2015/0127513 A1 | 5/2015 | Studnitzer et al. | |
| 2015/0127516 A1 | 5/2015 | Studnitzer et al. | |
| 2015/0161727 A1 | 6/2015 | Callaway et al. | |
| 2017/0126581 A1* | 5/2017 | Wadley | H04L 47/76 |

OTHER PUBLICATIONS

"What is Qos?", Microsoft, Mar. 28, 2003, 5 pages.
IEEE P802.1p, Wikipedia, Sep. 15, 2016, 2 pages.
Al-Shishtawy, Elastman: Elasticity Manager for Elastic Key-Value Stores in the Cloud, Aug. 5, 2013.
International Search Report and Written Opinion, from PCT/US2017/056858, dated Jan. 18, 2018.
Ying Liu, ProRenaTa: Proactive and Reactive Tuning to Scale a Distrubuted Storage System, 2015 15th IEEE/ACM International Symposium on Cluster, Cloud and Grid Computing, 2015.

* cited by examiner

| Message | Latency (microseconds) | Delta Value from Previous | Impact of Delta Value | Impact Value Moving Average |
|---|---|---|---|---|
| M1 | 8 | n/a | n/a | n/a |
| M2 | 9 | 1 | 1 | n/a |
| M3 | 14 | 5 | 1 | n/a |
| M4 | 14 | 0 | 0 | 2/3 |
| M5 | 6 | -8 | -1 | 0 |
| M6 | 4 | -2 | -1 | -2/3 |

Fig. 5A

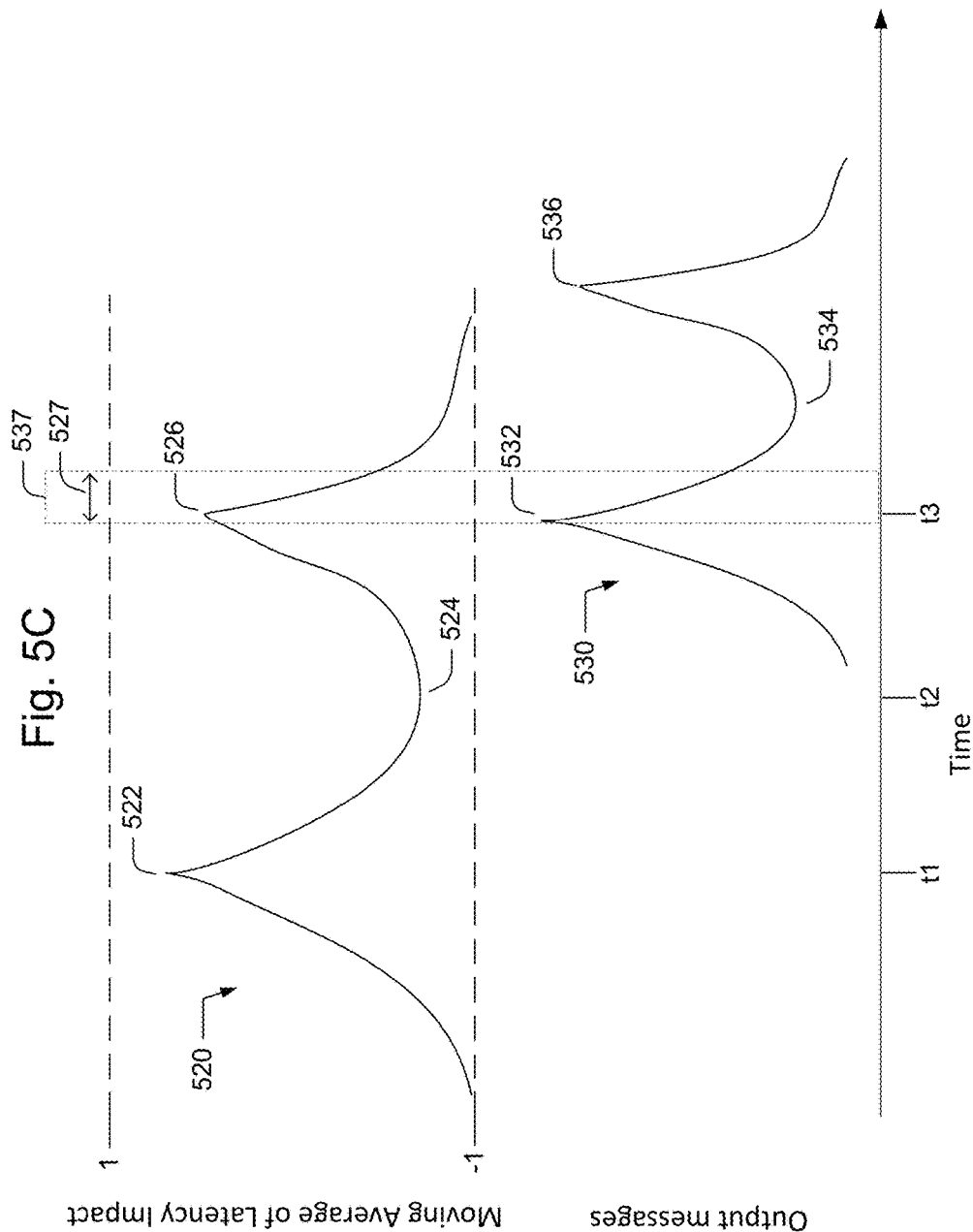

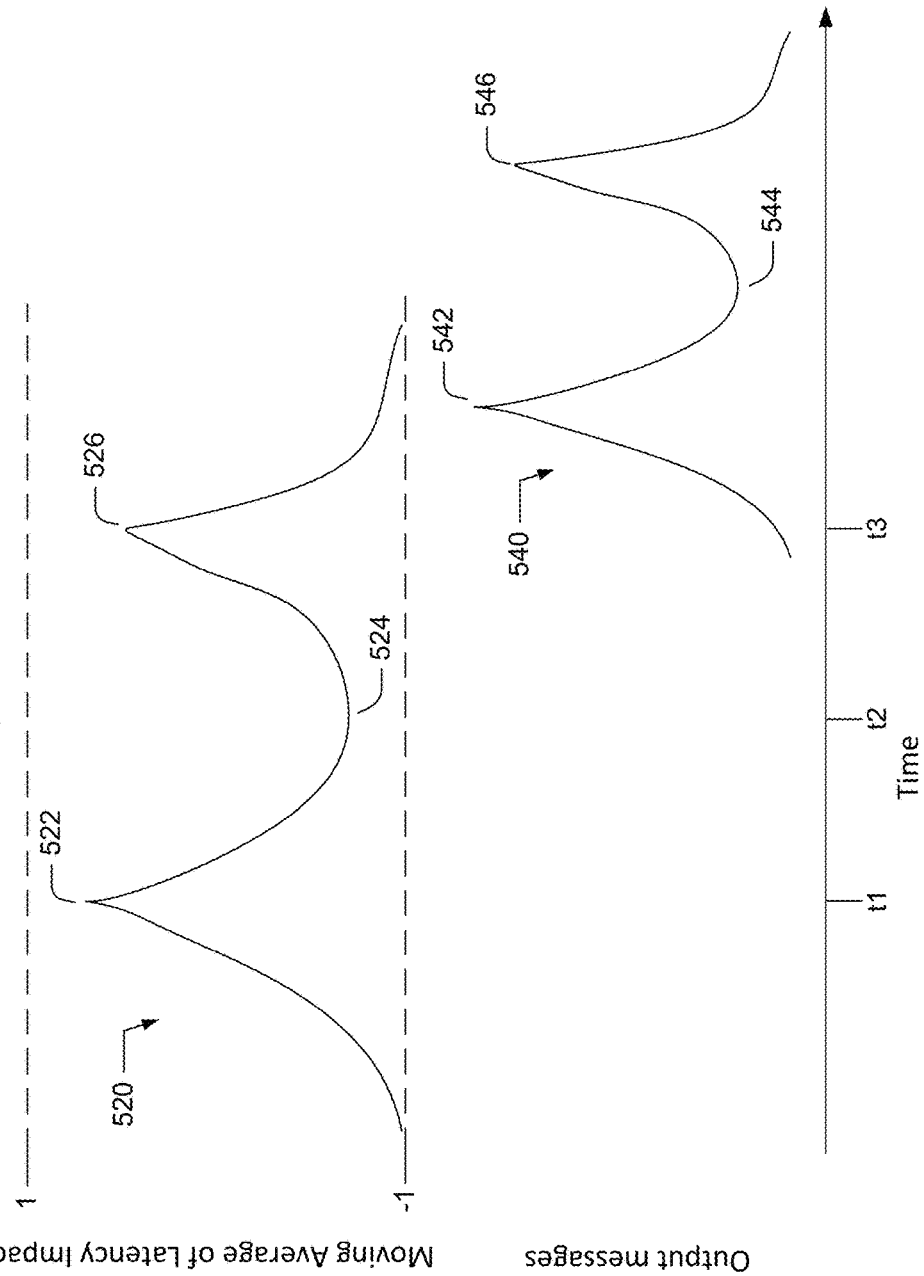

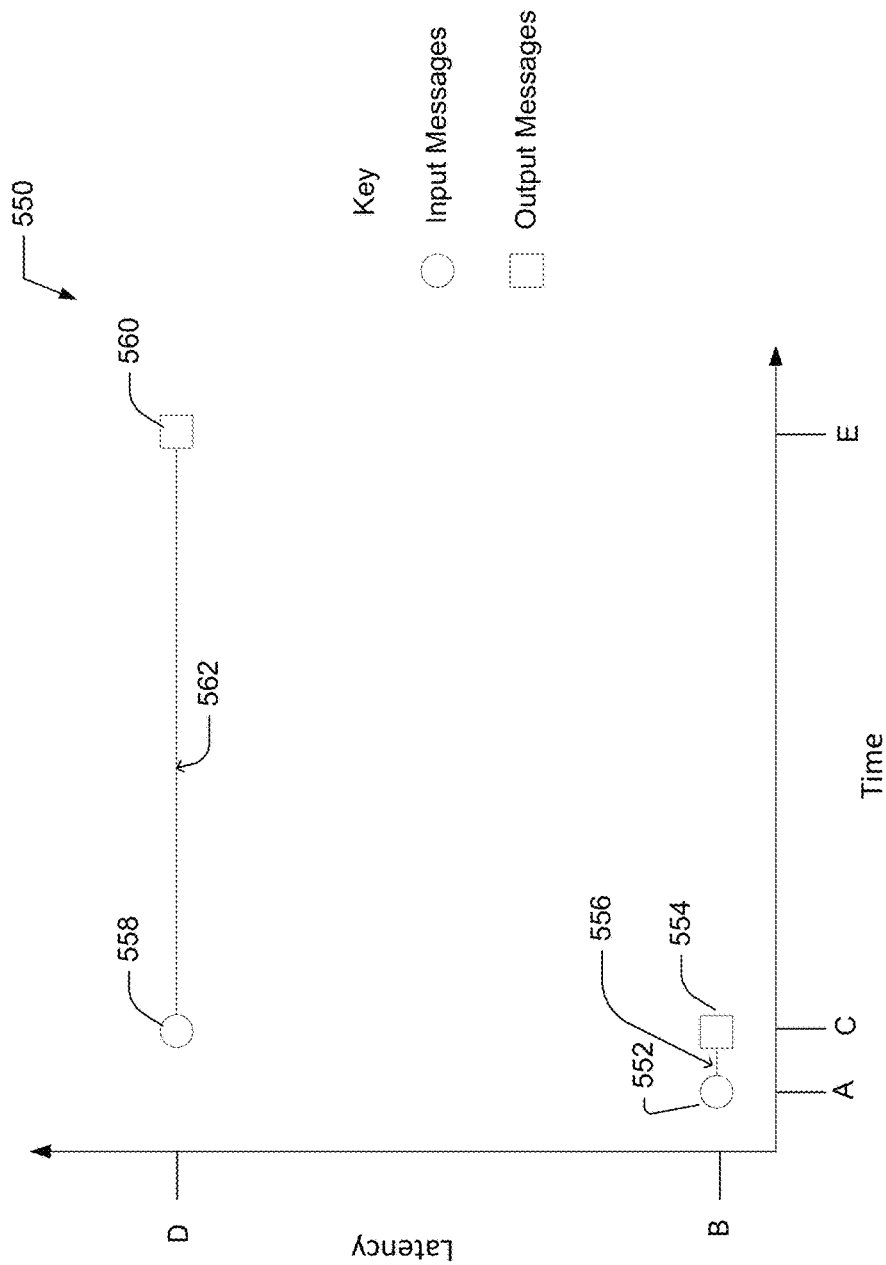

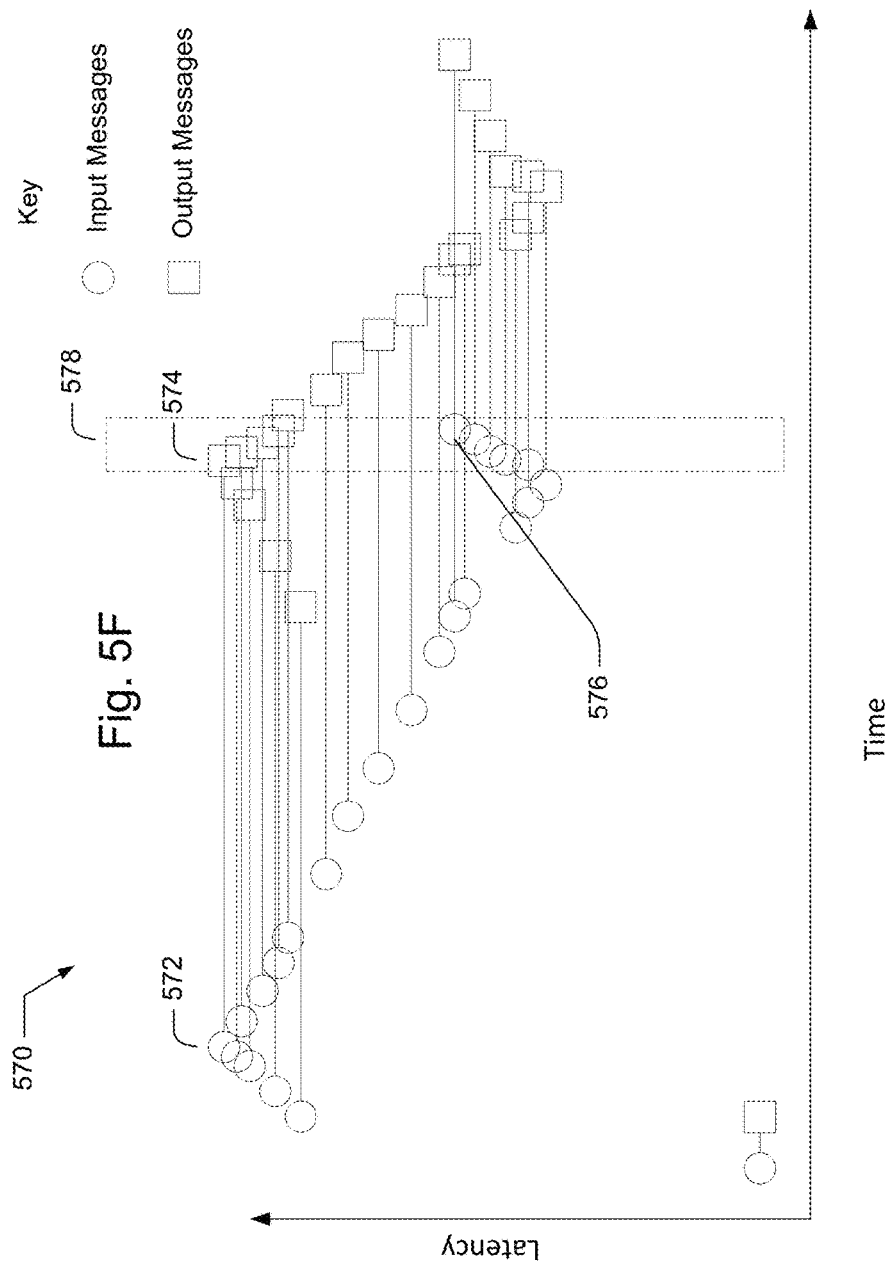

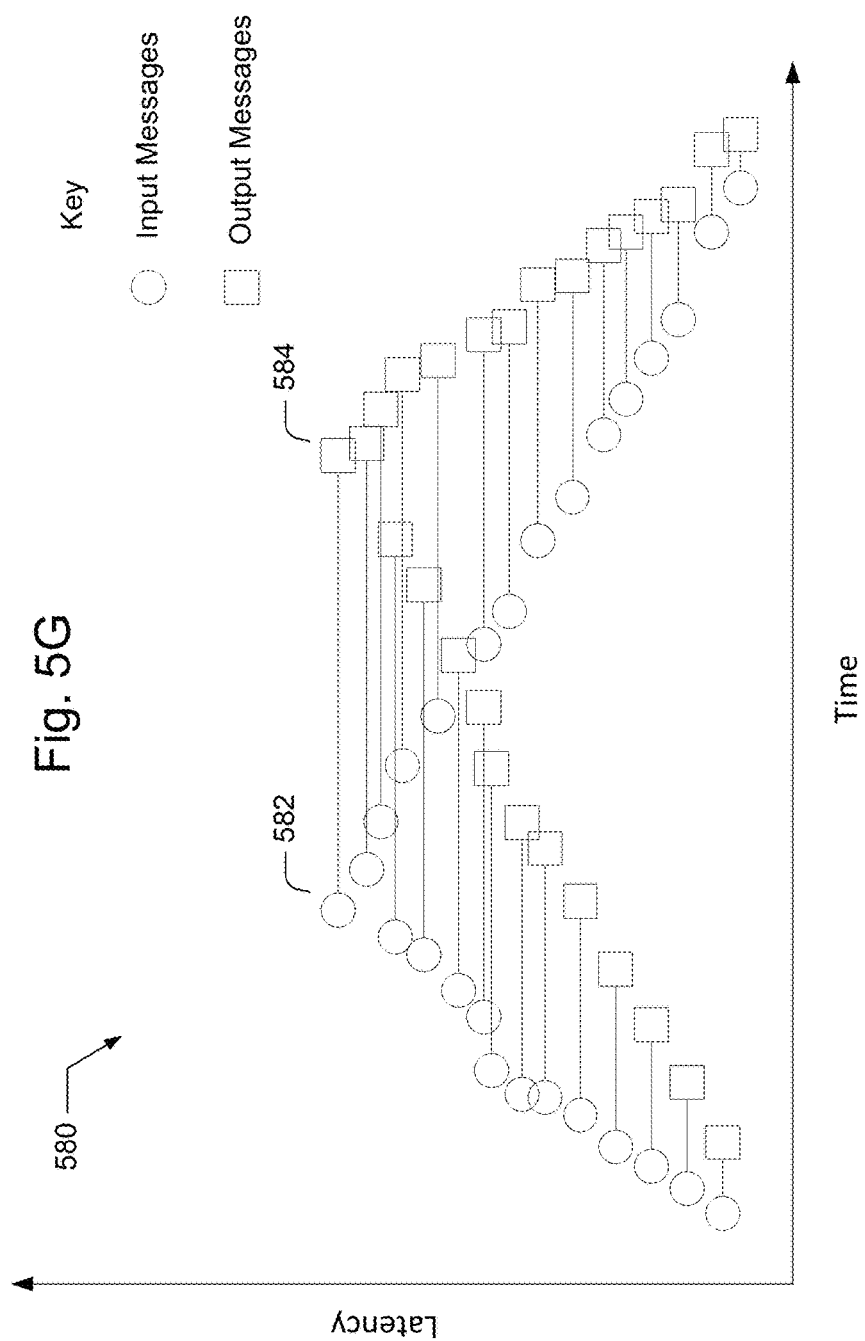

RESOURCE ALLOCATION BASED ON TRANSACTION PROCESSOR CLASSIFICATION

BACKGROUND

Data transaction processing systems including multiple transaction processors typically have a finite or fixed amount of computing resources to be allocated amongst the various transaction processors. The computing resources may be of different types, e.g., input bandwidth compared to output bandwidth for a given transaction processor, or overall bandwidth, or time division frequency access, quality of service, or priority, associated with one transaction processor as compared to another transaction processor. Computing resources that can be allocated also include memory, CPU processing cycles, cores or threads dedicated to performing specific tasks. An efficient computing system allocates an optimum amount of its finite resources to the various processors, and the tasks performed by its processors. In a data transaction processing system including multiple different data transaction processors having finite computing resources, the optimum allocation of the various computing resources may vary for each of the data transaction processors.

BRIEF DESCRIPTION OF THE DRAWINGS

FIG. 5A illustrates an example table including data associated with input messages.

FIG. 5C illustrates a pair of example input output curves.

FIG. 5D illustrates another pair of example input output curves.

FIG. 5E illustrates an example input-output plot in accordance with the disclosed embodiments.

FIG. 5F illustrates another example input-output plot in accordance with the disclosed embodiments.

FIG. 5G illustrates yet another example input-output plot in accordance with the disclosed embodiments.

DETAILED DESCRIPTION

Figure 1:
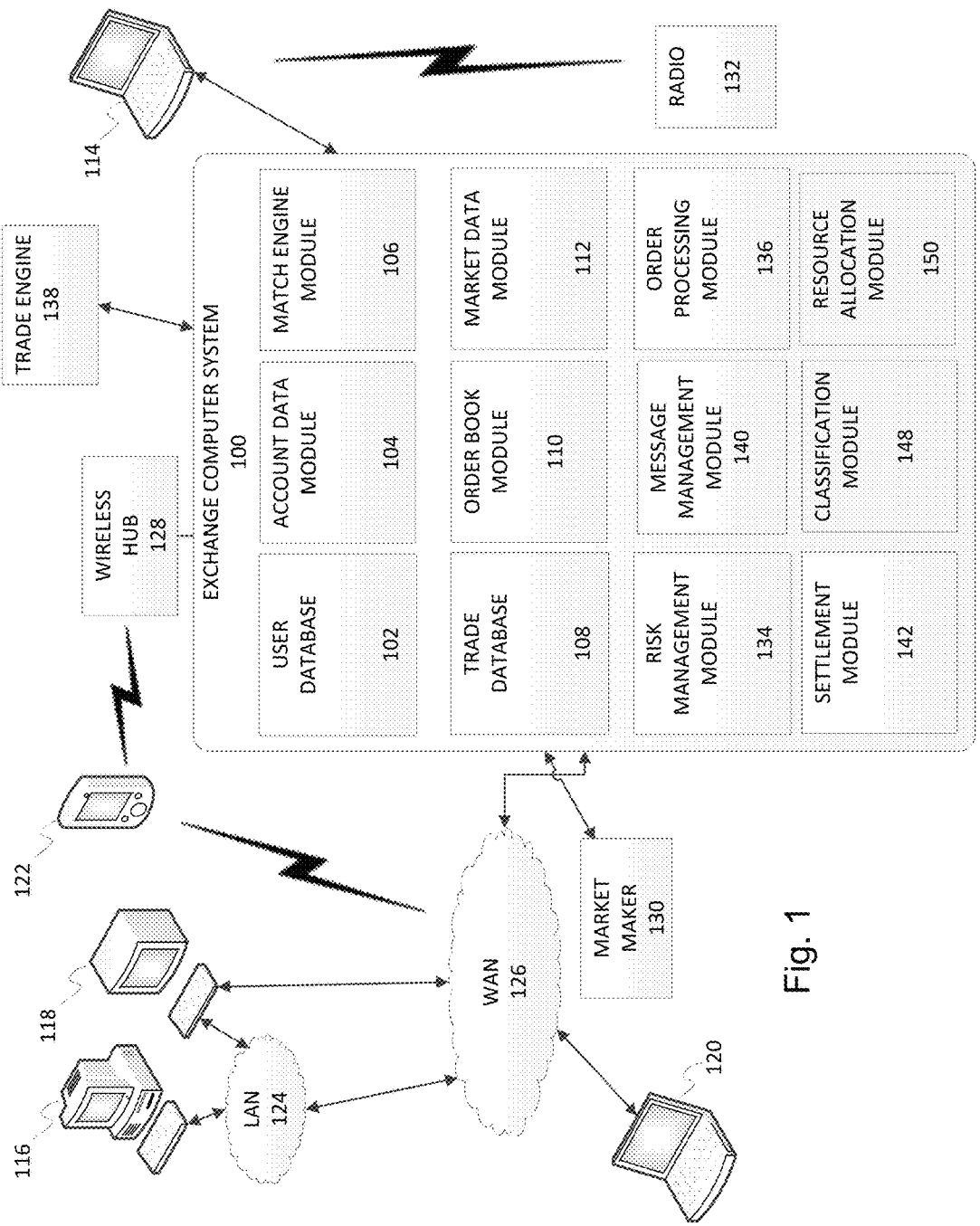
FIG. 1 depicts an illustrative computer network system that may be used to implement aspects of the disclosed embodiments.

The disclosed embodiments relate generally to a data communications system/network, for use by a data transaction processing system, which includes a resource allocation system for classifying transaction processors based on transaction requests received by each transaction processor and the responses processed thereof, and automatically allocating computing resources based on the transaction processor classification.

The resource allocation system may, in one embodiment, operate in a stateful manner, i.e., depend upon historical/prior messages received, and/or rely upon previous results thereof or previous decisions made, by the transaction processing system. The resource allocation system may also access data structures storing information about a current environment state to classify transaction processors.

The disclosed resource allocation system improves upon the technical field of computer processing by classifying, or otherwise characterizing, transaction processors, or characterizing the state of a transaction processor, and dynamically allocating resources as needed within a data transaction processing system including multiple transaction processors.

The transaction processors may be re-classified at periodic intervals, or upon events such as receiving groups of incoming or input messages. The transaction processors may be characterized based upon transaction processor activity, such as receiving instruction messages, publishing or transmitting responsive messages, and receiving more instruction message responsive to the published messages.

The disclosed resource allocation system is a specific implementation and practical application that characterizes a transaction processor, or a state thereof, based on input-output patterns to determine whether transaction processor activity is reactive or related. The results are useful in allocating a discrete or finite amount of computing resources to input or output bandwidth associated with data transaction processing system transaction processors. The disclosed resource allocation system efficiently distributes a finite amount of computing resources among a variety of different transaction processors based on activity patterns associated with the transaction processors. The activity patterns may be detected by implementing a data plotting ruleset and structure that highlights key activity events, such as inflection points, changes in activity, and volume. The resource allocation system can accordingly maximize the processing power of a set of transaction processors within a data transaction processing system.

The system increases efficiencies in an exchange computing system's matching processors by determining how much of a given matching processor's processing throughput depends on data inputs versus outputs. The system can dynamically re-classify and re-allocate resources as transaction processor activity and responses change or evolve.

The disclosed embodiments are directed to a particular implementation of detecting message and response patterns by plotting activity on a specific plot coordinate system according to fixed rules. The plotted activity can then be classified, enabling computing resource allocation thereupon. At least some of the problems solved by the disclosed resource allocation system are specifically rooted in technology, specifically in data communications where multiple messages are communicated by multiple sources, e.g., multiple customer computers, over a computer network to a central counterparty, e.g., an exchange computing system that attempts to match customer messages, where the input activity may or may not be influenced by transaction processor responses to the inputs.

In one embodiment, the resource allocation system is a particular practical and technological solution for a centralized processing system having multiple transaction processors that receives arbitrary/unpredictable inputs from multiple sources, where the input activity and response thereof define the resources needed by each transaction processor. Such technologically rooted problems may be solved by means of a technical solution, the grouping of activity related to each transaction processor as events, characterizing each transaction processor based on the activity, and allocating resources to the transaction processors based upon transaction processor characterization or classification. The classification, allocation, or both may be dynamic. In one embodiment, the transaction processor classification and resource allocation may be performed at predetermined intervals.

The disclosed embodiments solve a problem arising in state-dependent trading and transaction processing where processing latencies may be used to characterize, or classify or categorize, transaction processors and allocate resources accordingly.

Accordingly, the resulting problem is a problem arising in computer systems due to allocating data transaction processing system computing resources to different transaction processors that receive and process messages and publish responsive output messages, where the activity pattern, when plotted onto a new specific data plot and stored as a new data structure, defines the required computing or bandwidth resources. The solutions disclosed herein are, in one embodiment, implemented as automatic responses and actions by an exchange computing system computer.

The disclosed embodiments may be directed to an exchange computing system that includes a hardware matching processor that attempts to match electronic data transaction request messages with other electronic data transaction request messages counter thereto. Input electronic data transaction request messages may be received from different client computers over a data communication network, and output electronic data transaction request messages may be transmitted to the client computers and may be indicative of results of the attempts to match incoming electronic data transaction request messages.

For example, one exemplary environment where resource allocation is desirable is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/ receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

The disclosed embodiments recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system.

Financial messages communicated to the electronic trading system, also referred to as "inbound" messages, may include associated actions that characterize the messages, such as trader orders, order modifications, order cancellations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple MSGs, one for each market/product implemented thereby. For more detail on deterministic operation in a trading system, see U.S. patent application Ser. No. 14/074,667 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013, the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" or Market By Order "MBO" format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages carry much more data because they reflect any market impacting change. Furthermore, because specific orders, but not the submitting traders thereof, are identified, other market participants may be able to follow that order as it progresses through the market, e.g., as it is modified, canceled, traded, etc.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. As such, MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. patent application Ser. No. 14/100,788, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields.

The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

While the disclosed embodiments will be discussed with respect to an MBP market data feed, it should be appreciated that the disclosed embodiments may also be applicable to an MBO market data feed.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
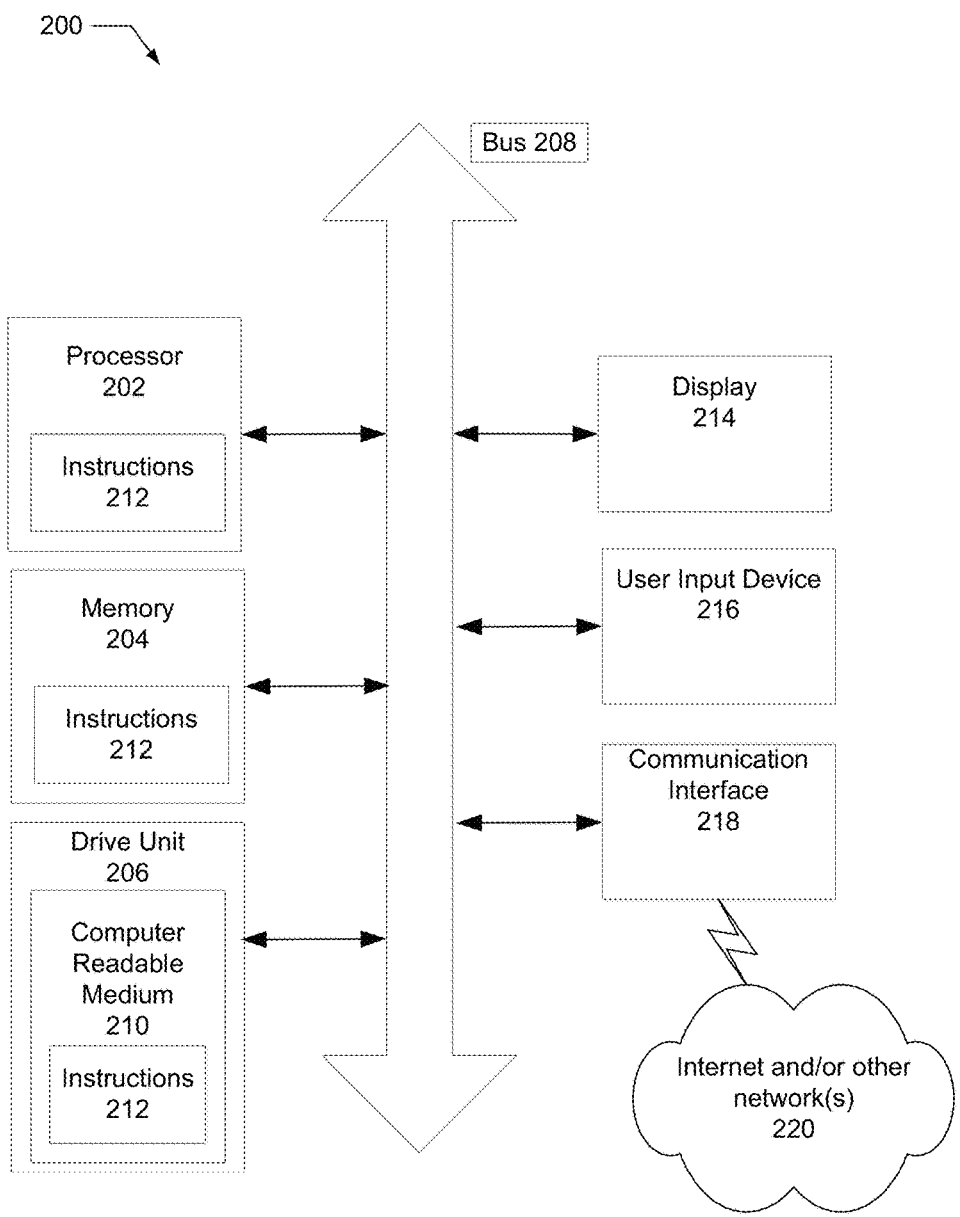
FIG. 2 depicts an illustrative embodiment of a general computer system for use with the disclosed embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described herein.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed embodiments.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some embodiments, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

A classification module 148 may be included to detect a market type, and a resource allocation module 150 may be included to assign, e.g., dynamically, fixed resources to various match engines.

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 134, the order processing module 136, the message management module 140, the settlement module 142, classification module 148, resource allocation module 150, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

Figure 3:
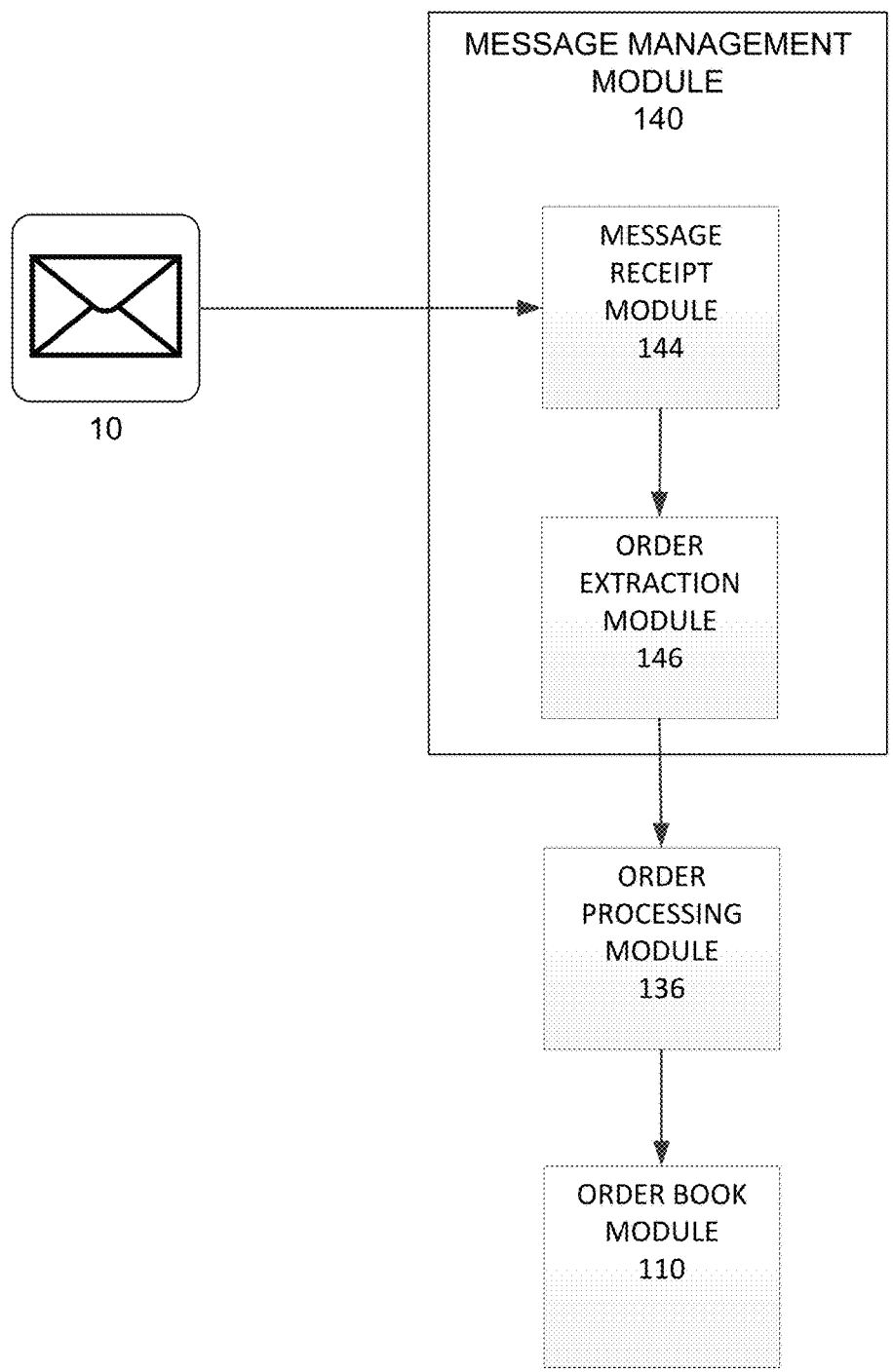
FIG. 3 depicts an example market order message management system for implementing the disclosed embodiments.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. FIG. 3 provides additional details for the message management module 140.

The disclosed mechanisms may be implemented at any logical and/or physical point(s), or combinations thereof, at which the relevant information/data may be monitored or is otherwise accessible or measurable, including one or more gateway devices, modems, the computers or terminals of one or more market participants, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

As shown in FIG. 1, the exchange computer system 100 further includes a message management module 140 which may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 3 illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

For example, the message management module 140 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

The embodiments described herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of officials related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other orders counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancellation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancellation may be considered a cancellation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase transaction, and higher than the reference value if the transaction is a sell transaction. Said another way, for purchase transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include:

Price Explicit Time
Order Level Pro Rata
Order Level Priority Pro Rata
Preference Price Explicit Time
Preference Order Level Pro Rata
Preference Order Level Priority Pro Rata
Threshold Pro-Rata
Priority Threshold Pro-Rata
Preference Threshold Pro-Rata
Priority Preference Threshold Pro-Rata
Split Price-Time Pro-Rata For example, the Price Explicit Time trading policy is based on the basic Price Time trading policy with Explicit Orders having priority over Implied Orders at the same price level. The order of traded volume allocation at a single price level may therefore be:

Explicit order with oldest timestamp first. Followed by
Any remaining explicit orders in timestamp sequence (First In, First Out—FIFO) next. Followed by
Implied order with oldest timestamp next. Followed by
Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.

2. Sort the list by order size, largest order size first. If equal order sizes, oldest timestamp first. This is the matching list.

3. Find the 'Matching order size, which is the total size of all the orders in the matching list.

4. Find the 'tradable volume', which is the smallest of the matching volume and the volume left to trade on the incoming order.

5. Allocate volume to each order in the matching list in turn, starting at the beginning of the list. If all the tradable volume gets used up, orders near the end of the list may not get allocation.

6. The amount of volume to allocate to each order is given by the formula:

(Order volume/Matching volume)*Tradable volume

The result is rounded down (for example, 21.99999999 becomes 21) unless the result is less than 1, when it becomes 1.

7. If tradable volume remains when the last order in the list had been allocated to, return to step 3.

Note: The matching list is not re-sorted, even though the volume has changed. The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.
2. Sort the list by explicit time priority, oldest timestamp first. This is the matching list.
3. Find the 'Matching volume', which is the total volume of all the orders in the matching list.
4. Find the 'tradable volume', which is the smallest of the matching volume and the volume left to trade on the incoming order.
5. Allocate volume to each order in the matching list in turn, starting at the beginning of the list.
6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.
8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume
4. Threshold Pro-Rata allocation of any remaining incoming volume
5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein. In one embodiment, the disclosed embodiments may be used in any combination or sequence with the allocation algorithms described herein.

One exemplary system for matching is described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon, discloses an adaptive match engine which draws upon different matching algorithms, e.g., the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine automatically adapts to the changing market conditions of a financial product, e.g., a limited life product, in a non-preferential manner, maintaining fair order allocation while improving market liquidity, e.g., over the life of the product.

In one implementation, this trading system may evaluate market conditions on a daily basis and, based thereon, change the matching algorithm between daily trading sessions, i.e., when the market is closed, such that when the market reopens, a new trading algorithm is in effect for the particular product. As will be described, the disclosed embodiments may facilitate more frequent changes to the matching algorithms so as to dynamically adapt to changing market conditions, e.g., intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways.

Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed embodiments may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly}=\text{Leg1}-2\times\text{Leg2}+\text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 142.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

The disclosed embodiments may be implemented in a data transaction processing system that processes data items or objects. Customer or user devices (e.g., computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a given value. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items. The specifically configured matching processors may match electronic data transaction request messages based on multiple transaction matching parameters from the different client computers. The specifically configured matching processors may additionally generate information reported to data recipient computing systems via outbound messages published via one or more data feeds.

The disclosed resource allocation system may be implemented to automatically classify a matching processor. Based on the classification, the resource allocation system reallocates computing resources, e.g., input output data bandwidth, among the various matching processors to maximize network utilization. A component or data path being allocated an amount of resources may mean, or may include, the component or data path having access to or the right to use the corresponding resources.

An exchange computing system, such as one implemented by the CME, may include a resource allocation system which determines the latency experienced by messages, and input output message response characteristics to identify or characterize, or otherwise classify, a matching processor, or a dynamically changing state thereof.

The exchange computing system may be configured to detect the time signal data associated with incoming transactions, or data indicative of a time of receipt of the transaction. For more detail on tracking the time of receipt of incoming messages in an exchange computing system, see U.S. patent application Ser. No. 15/232,224, filed on Aug. 9, 2016, entitled "Systems and Methods for Coordinating Processing of Instructions Across Multiple Components", the entirety of which is incorporated by reference herein and relied upon. The time signal data may be used to determine and detect the actual latency experienced by a message, as well as the timing of responsive input and output messages. The resource allocation system may identify and detect timing of input output message patterns over the course of multiple communication cycles to and from the users and the exchange computing system, until the end of an event or related events is identified.

The time signal data may be collected at a variety of points throughout the exchange computing system. In one embodiment, the time signal data may be collected at the MSG for a particular match engine. The exchange computing system may be configured to collect time signal data at multiple points within the exchange computing system, as the message is received by the exchange computing system and its progression and routing to and through the match engine module, which may include multiple queues and processing components, each of which may contribute to an overall latency experienced by the message.

In one embodiment, the time signal data may be retrieved from information included in the message. For example, the submitter may include information in the message indicating the time that the submitter transmitted the message. For example, messages submitted to the CME Group exchange computing system may include a Tag 52 identifier, which may be an identifier within a message that represents the time at which the message was sent by a submitter. The exchange computing system could use the Tag 52 identifier time to determine the latency experienced by a message in transit as well as subsequent to receipt.

Figure 4A:
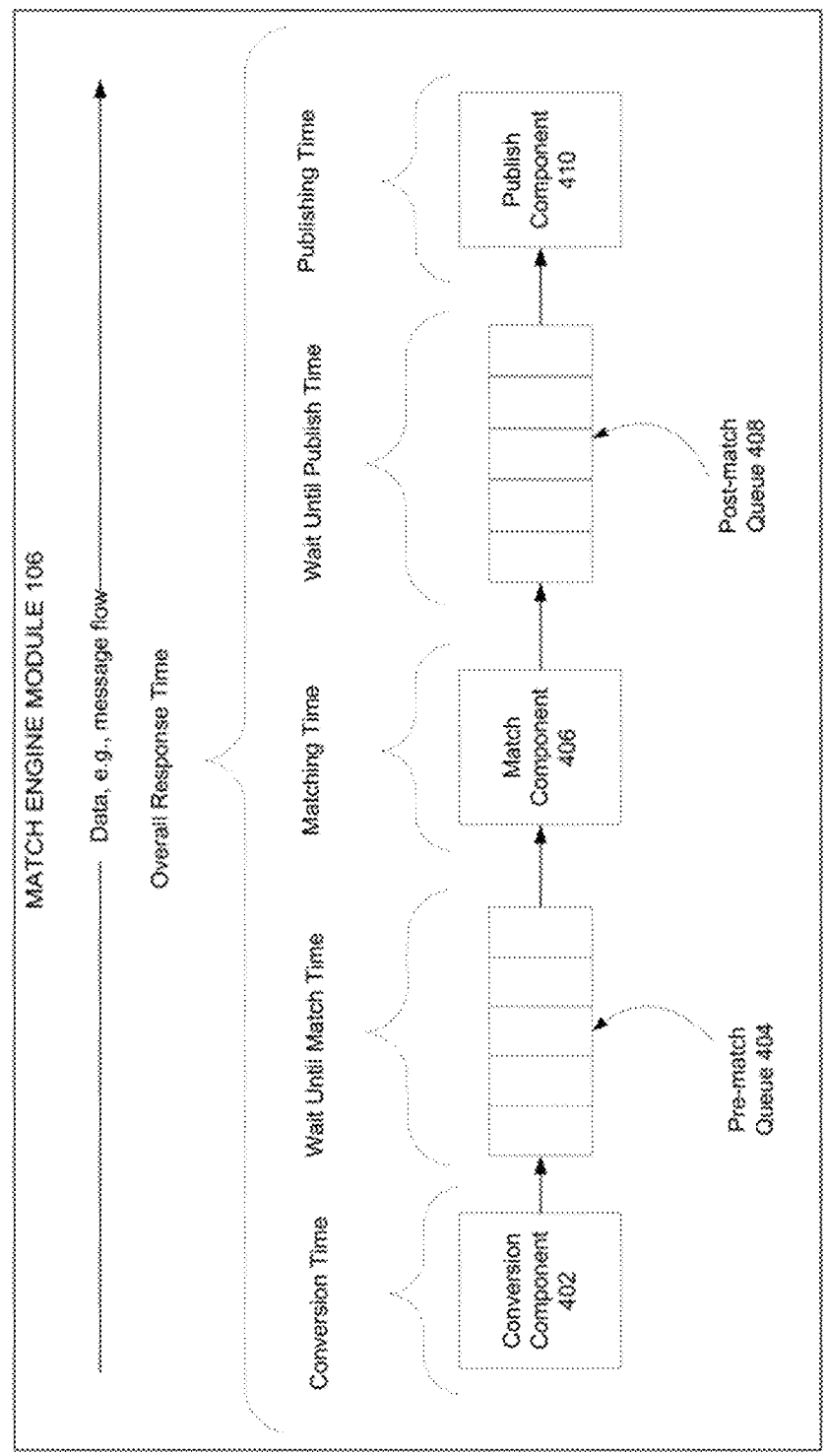
FIGS. 4A to 4E depict example match engine and resource allocation modules implementing the disclosed embodiments.

FIG. 4A illustrates an example embodiment of a match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be depicted sequentially in queues, e.g., in FIG. 4B below, may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first in first out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

In one embodiment, the resource allocation system may detect how much time elapses between the exchange computing system (i) receiving a given input message and (ii) publishing a first output message responsive to the given input message.

In one embodiment, the resource allocation system may track the number of components or queues through which a message may be routed, and may also track any processing performed on the message, before the message reaches or enters the match component 406. In one embodiment, the resource allocation system may track the amount of time spent by a message in each component or queue, and may also track the amount of time the message was processed, until the message is published by the publish component 410. In one embodiment, the resource allocation system detects the time signal data associated with a message when the message is received by the exchange computing system and time signal data associated with the message when the message exits the publish component 410.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a messages spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out FIFO methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue. The disclosed resource allocation system in one embodiment determines how long a message waits in the pre-match queue (e.g., latency), and determines whether the latency is less than or greater than the acceptable latency specified in the message. If the latency experienced by a message exceeds the acceptable latency specified within a message, the exchange computing system cancels the message without letting the message match, even if the message would have otherwise matched with a message resting on the order book.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4A, a primary difference between the pre- and post-match queues is the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

As noted above, the match engine module in one embodiment operates in a first in first out (FIFO) scheme. In other words, the first message that enters the match engine module 106 is the first message that is processed by the match engine module 106. Thus, the match engine module 106 in one embodiment processes messages in the order the messages are received. In FIG. 4A, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publically viewable and accessible. Traders consuming such published messages may act upon those message, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, a new order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in", or processed, or committed, upon reaching and entering the match component. If the terms of the aggressing order match a resting order when the aggressing order enters the match component, then the aggressing order will be in one embodiment guaranteed to match.

As noted above, the latency experienced by a message, or the amount of time a message spends waiting to enter the match component, depends upon how many messages are ahead of that message (i.e., earlier messages), and how much time each of the earlier messages spends being serviced or processed by the match component. The amount of time a match component spends processing, matching or attempting to match a message depends upon the type of message, or the characteristics of the message. The time spent inside the processor may be considered to be a service time, e.g., the amount of time a message spends being processed or serviced by the processor.

The resource allocation system may be applicable to any data transaction processing system that includes multiple transaction processors and a fixed amount of computing resources that can be allocated amongst the processors. Resource allocation is especially important in an application such as multiple match engines of a financial exchange having fixed computing resources allocated therebetween, where the match engines may be reactionary, non-reactionary, or may dynamically oscillate between these states. In a financial exchange match engine, resource allocation based on market classification can vastly improve overall network and bandwidth utilization.

The number of matches or fills that may be generated in response to a new order message for a financial instrument will depend on the state of the data object representing the electronic marketplace for the financial instrument. The state of the match engine can change based on the contents of incoming messages.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends:

Being converted in the conversion component 402 may be referred to as a conversion time;

Waiting in the pre-match queue 404 may be referred to as a wait until match time;

Being processed or serviced in the match component 406 may be referred to as a matching time;

Waiting in the post-match queue 408 may be referred to as a wait until publish time; and Being processed or published via the publish component 410 may be referred to as a publishing time.

It should be appreciated that the latency may be calculated, in one embodiment, as the sum of the conversion time and wait until match time. Or, the system may calculate latency as the sum of the conversion time, wait until match time, matching time, wait until publish time, and publishing time. In systems where some or all of those times are negligible, or consistent, a measured latency may only include the sum of some of those times. Or, a system may be designed to only calculate one of the times that is the most variable, or that dominates (e.g., percentage wise) the overall latency.

For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component.

Figure 4B:
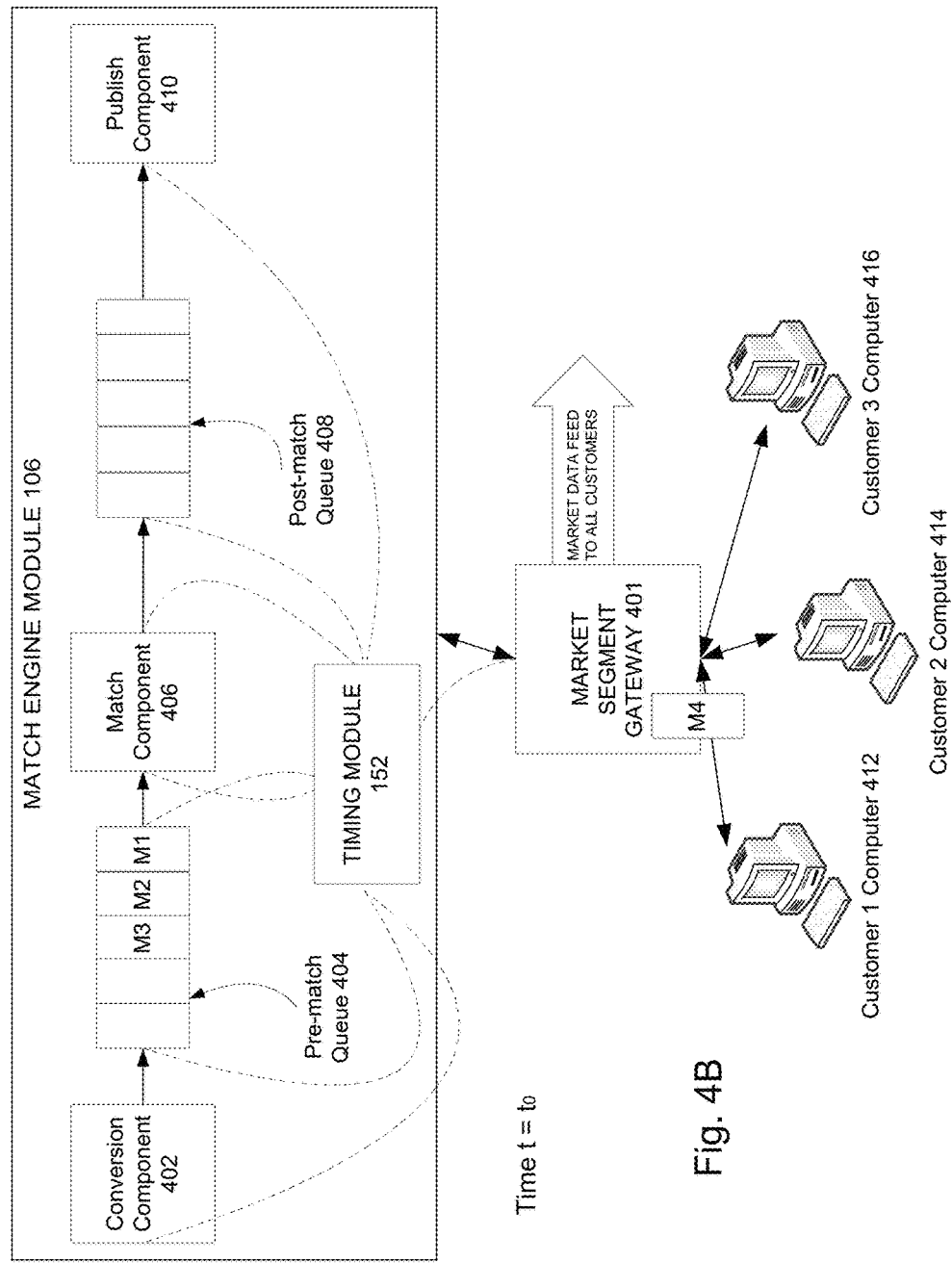

FIG. 4B illustrates an example match engine module 106 processing messages M1, M2, M3 at time $t=t_0$. Messages M1, M2, M3 may be orders from various customers received by the exchange computing system earlier than time $t=t_0$. For example, in the illustrated embodiment, Customer 1 Computer 412 submits message M1, then Customer 2 Computer 414 submits message M2, and then Customer 3

Computer 416 submits message M3. The messages are sent via Market Segment Gateway 401.

The speed at which the messages can be received by the match engine module, e.g., the transaction processor, depends on the resources allocated to receiving messages, e.g., input bandwidth, associated with the transaction processor.

The three messages are converted into an appropriate format by the conversion component 402 and are placed in sequential order into pre-match queue 404. In particular, message M1 is placed into the pre-match queue 404 first, message M2 is placed into the pre-match queue 404 next, and then message M3 is placed into the pre-match queue 404. As shown, message M1 which was received by the match engine module 106 first is the closest to the match component 406. Match component 406 may be processing or matching previously received orders. Or, match component 406 may be empty, indicating little or no matching activity.

The disclosed resource allocation system may include, in one embodiment, a timing module 152, as shown in FIG. 4B, as part of an exchange computing system. The timing module 152 may be configured to be in communication with the Market Segment Gateway 401 as described herein. As illustrated via dashed lines connecting the timing module 152 with various logical points within the exchange computing system, the timing module 152 can augment and/or read time signal data as messages are routed through or progress through various locations with the exchange computing system. For example, as shown in FIG. 4B, the timing module 152 detects that the MSG 401 receives Message M4 at time $t=t_0$. Message M4 may be submitted, for example, by Customer 1. The timing module 152, located within the exchange computing system, accordingly receives M4 and determines time signal data for when M4 was received by the exchange computing system.

Figure 4C:
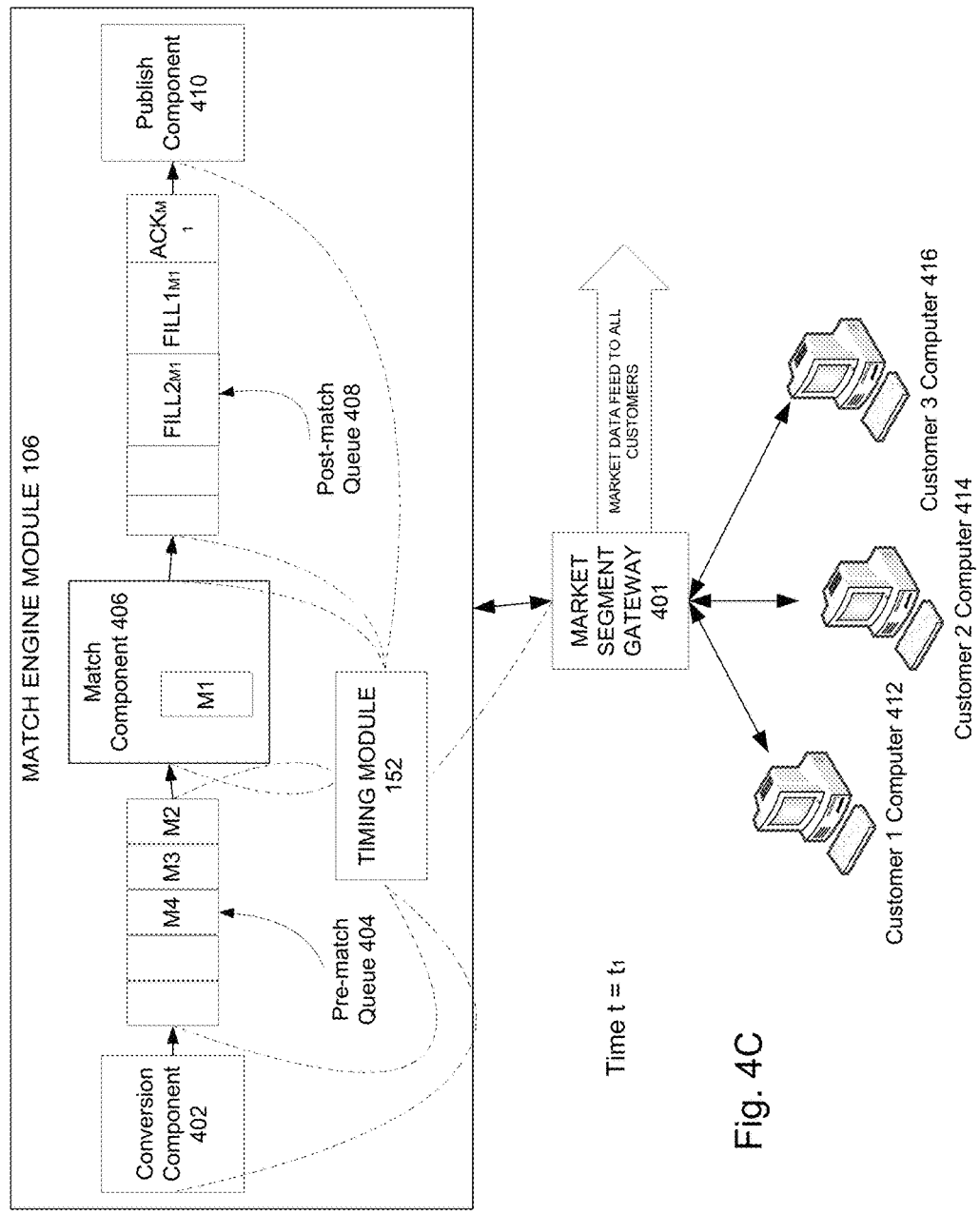

As illustrated in FIG. 4C illustrating match engine module 106 at time $t=t_1$ later than time $t=t_0$, message M1 then enters match component 406. The pre-match queue 404 now holds messages M2, M3, as well as newly received order message M4. New message M4 is placed in the pre-match queue in the order it was received by the match engine module. In particular, as shown in the illustrated example of FIG. 4C, message M4 is placed after messages M2 and M3 in the pre-match queue 404.

Match component 406 processes message M1. Message M1 may be an order to buy a futures contract. Or, message M1 may be a butterfly spread of futures contracts including one buy, two sells, and one buy at different times. Depending on the contents of message M1 and the state of the order book, message M1 may match multiple resting orders, or may not match any resting orders.

Match engine module 106 generates response messages, or match component results or transaction component results, in response to processing message M1. For example, the exchange system may be configured to send an acknowledgement message back to each customer that sends in an order message. Or, the exchange system may be configured to send fill messages whenever an aggressing or entered order matches a resting order on the books. For example, if message M1 includes an order that matches a resting order previously submitted by Customer 3, the exchange system sends fill messages to both Customer 1 (who submitted message M1) and Customer 3 (who submitted the resting order matched by message M1). Thus, the processing or matching of message M1 generates match component results, namely, an acknowledgement message $ACK_{M1}$ and fill messages $FILL1_{M1}$ and $FILL2_{M1}$. Message $ACK_{M1}$ may be sent to Customer 1 acknowledging that message M1 has entered the match component. Message $FILL1_{M1}$ may be sent to Customer 1 indicating that its aggressing order M1 was filled. Message $FILL2_{M1}$ may be sent to Customer 3 indicating that one of its resting orders was filled. These newly generated messages are placed in the post-match queue 408 where they await to be published. For example, the publish component 410 may include other messages that need to be published to market participants or sent to market data feeds.

It should be understood that the exchange computing system may transmit data individually to customers 1, 2 and 3, e.g., over private connections to those customers, or may publish data publically via market data feeds, so that all customers subscribing to a data feed can receive messages about that data feed. Each transaction processor may be associated with a public data feed that publishes messages responsive to the processed messages. In markets that are reactionary, customers may transmit messages back to the exchange computing system upon receiving and consuming published output messages. In markets that are non-reactionary, customers' input messages may not be responsive to published output messages. The disclosed embodiments resource allocation system detects, based on a pattern plotted according to specific rules, whether input-output message patterns for a transaction processor indicate a reactionary market, and allocates resources accordingly to maximize efficiency and utilization.

A system may generate a variety of result messages, including but not limited to acknowledgement messages and fill messages. For example, the match component may generate any of the following types of match component results:

New Order Acknowledgements;
Modify Order Acknowledgements;
Cancel Order Acknowledgements;
Mass Quote acknowledgment;
Order Rejects;
Fills;
Banding Updates;
Limit Updates;
State Change messages; or
Security Definition messages.

The above list is an example, non-limiting list of the types of results messages that may be placed in the post-match queue following the match component or processor.

Figure 4D:
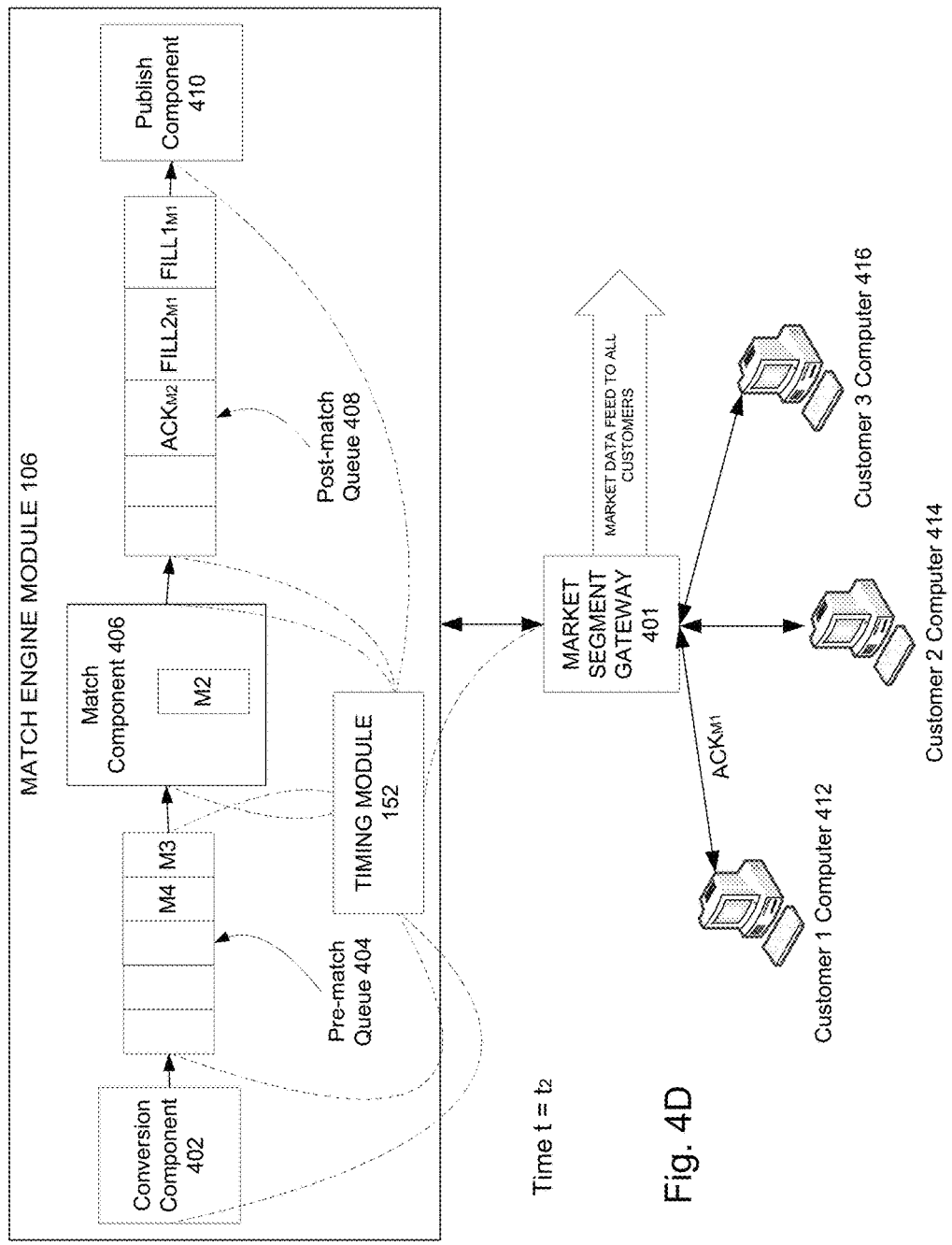

FIG. 4D illustrates a later state of the match engine module 106 at time $t=t_2$ later than time $t=t_1$. Once the match component finishes processing message M1, message M2 sequentially enters the match component 406. Match engine module 106 generates an acknowledgment message $ACK_{M2}$ in response to message M2 entering the match component. Acknowledgment message $AKC_{M2}$ acknowledges that message M2 has entered the match component. Message $AKC_{M2}$ will be sent to Customer 2 once the other messages in the post-match queue 408 are sequentially processed.

As noted above, the match component may also match aggressing or received orders with resting orders, and such matches may generate dozens, or perhaps hundreds or thousands, of fill messages that inform market participants that their orders have matched. These messages are also processed sequentially.

It should be appreciated that a given market participant will not know about messages sent in by other market participants. Thus, in one embodiment, a market participant may at best know what messages have been sent by that same market participant, but would not know about any other messages sent by other market participants. In one embodiment, the messages sent by other customers ahead of a given customer's message are private and unknown to the given customer sending the current message.

Figure 4E:
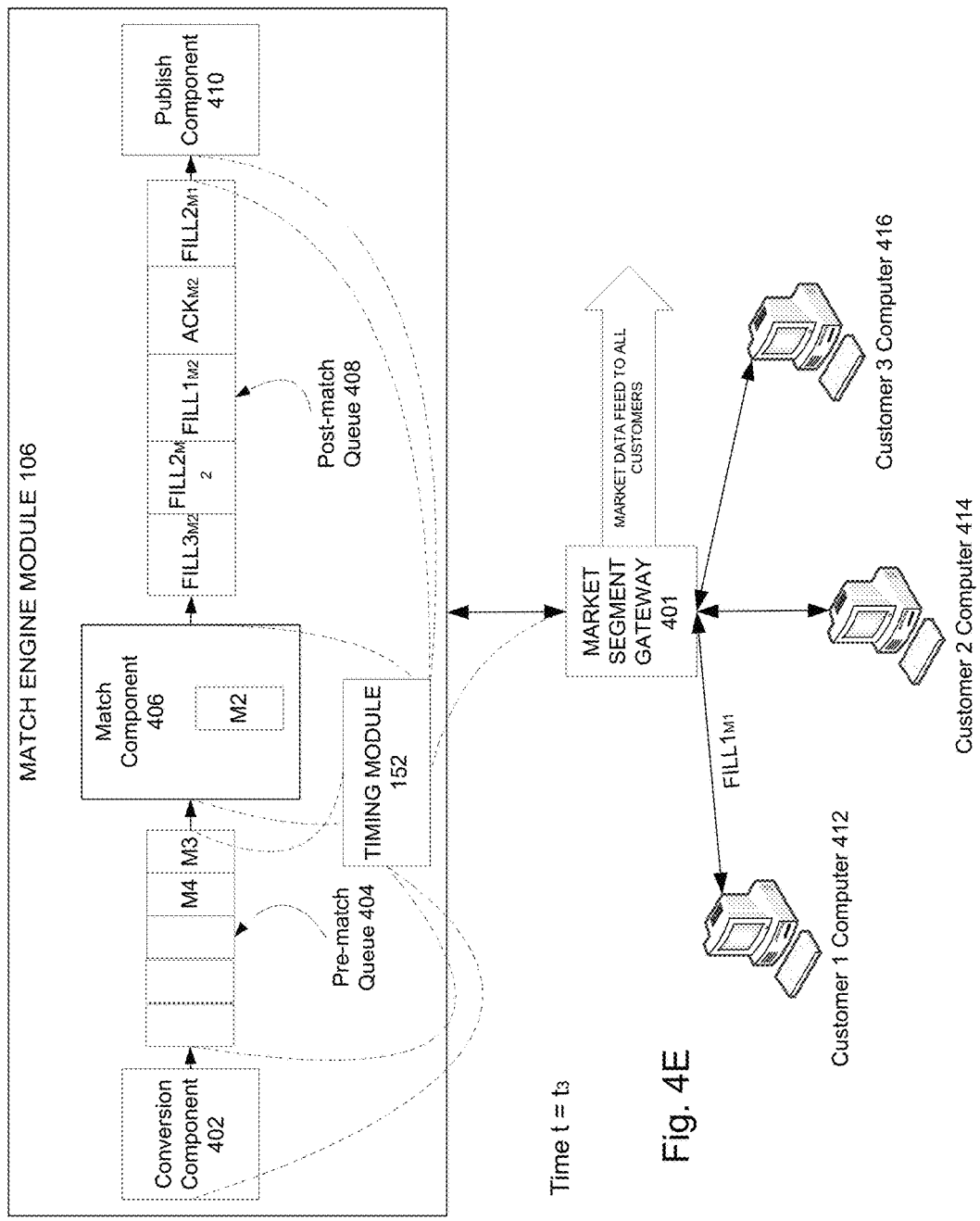

As shown in FIG. 4E, at time t=t$_3$ later than time t=t$_2$, match component 406 is still processing message M2. Thus, at time t=t$_2$, message M4 has experienced a latency equal to the time difference between the time M4 was received by the exchange computing system, namely, t$_0$, and t$_2$. The latency for M4 may be measured until M4 enters, or is about to enter, the match component 406.

Aggressing orders in message M2 have matched several resting orders, resulting in the generation of multiple fill messages FILL1$_{M2}$, FILL2$_{M2}$, and FILL3$_{M2}$. In one sense, some market participants may value such fill messages even more than acknowledgment message ACK$_{M2}$ because fill messages mean that orders have actually matched, or that orders sent in will be fulfilled. As noted above, an acknowledgment message only indicates that the match component received an order.

As illustrated in FIG. 4E, fill messages FILL1$_{M2}$, FILL2$_{M2}$, and FILL3$_{M2}$ are sequentially placed in post-match queue 408. Fill message FILL3$_{M2}$, for example, will not be published to the appropriate customer until all the messages in the post-match queue ahead of FILL3$_{M2}$, namely, FILL2$_{M1}$, ACK$_{M2}$, FILL1$_{M2}$, and FILL2$_{M2}$, have been sequentially published in that order.

In one embodiment, the latency may be the overall time to process a message, which may include the amount of time needed to generate and publish acknowledgment or fill messages based on the message. In one embodiment, the match component of the match engine may process an incoming message. Generating and publishing acknowledgment or fill messages resulting from processing the incoming message may also be considered to be part of processing the original, incoming message. For example, a message containing a new order may be received by the match engine and placed in the pre-match queue, and then sequentially processed by the match component. Once the match component performs or attempts to perform the actions specified by the new order message, e.g., match a resting order at the specified quantity and price, the new order message is discarded by the match component, and resulting acknowledgements and fills are then placed, in the order they were generated, in the post-match queue. These acknowledgements and fills are different from the new order message, but are an effect of the original new order message because they are the results of the instructions in the new order message. Thus, although the resulting acknowledgement and fill messages are different from the new order message, generating and publishing resulting acknowledgements and fills may be considered to be part of processing the new order message.

It should be appreciated that the match engine module 106 is an example of a transaction processing system that can implement the disclosed systems and methods. The transaction processing system may include a pre-transaction queue coupled with a transaction component that matches or processes the messages it receives. The transaction processing system may also include a post-transaction queue coupled with a distribution component that distributes messages to other computers, e.g., market participant computers.

In a FIFO or sequential system, the time spent waiting in a queue is largely a result of the other earlier messages in the queue. The type of earlier messages in a queue at any given time, and the amount of time required to process them, is random and a reflection of the current state of the queue. A fair and efficient system that seeks to provide accurate results should avoid the use of or reliance on state-specific data that is independent of a newly received message.

For example, a message received by the match engine when the pre-match queue is full may take a long time to reach the match component. That same message received by the match engine when the pre-match queue is empty will quickly reach the match component. Yet, in either case, the amount that message spends in the match component is unrelated to how long that message waited in the pre-match queue.

In other words, the amount of time a given message spends being serviced by the match component depends on the contents and characteristics of the given message, as well as the current state of the order book. But, the amount of time a given message waits in the pre-match queue depends on the messages (or earlier messages) ahead of the given message, and how long those earlier messages spend being serviced by the match component.

Thus, how long the message waits in the pre-match queue depends on the queue, not the message itself or its characteristics.

From an architectural and timing standpoint, in a FIFO system, a processor, component or thread is associated with the queue preceding that processor. Thus, a queue and its processor or component may be seen as a corresponding pair within a transaction processing system. The pre-match queue precedes the match component. The post-match queue precedes the publish component. In one embodiment, the post-match queue may be referred to as a pre-publish queue.

A response time for a message may be a service time in a processor plus the wait time in the queue for that processor. Or, a response time may be the sum of all the service times and all the wait times for all the processors and queues inside of an engine.

The match engine module may, in one embodiment, also be configured to estimate how much time it would take to process already received/queued messages, as described in U.S. patent application Ser. No. 14/879,614, filed on Oct. 9, 2015, entitled "Systems and Methods for Calculating a Latency of a Transaction Processing System" ("the '614 application"), the entirety of which is incorporated by reference herein and relied upon.

As discussed above, exchange computing system publishes one or more market data feeds, via market data module 112, informing market participants about the state of one or more order book objects. The disclosed methods and systems may use a market data feed or some other mechanism for communicating the current state of the match engine, e.g., transaction component, so that message submitters can determine whether their messages have yet been processed by the transaction component, or are still awaiting transaction processing. The current state may be included in existing market data feeds, or may be presented in its own data feed. An exchange may output multiple market data feeds for multiple market segments.

The match engine module may be configured to associate output (or outgoing) messages with input (or incoming) messages. In other words, the match engine module keeps track of which output messages are associated with, or responsive to, which input messages.

Exchange computing system users may have experience and knowledge about certain financial instruments or certain markets. Such market participants submit messages to the exchange computing system to implement electronic trading strategies. Thus, the messages submitted by market participants may be considered to define their trading strategies.

The trading strategies may inform whether or not users react to market data feeds (e.g., output messages from the exchange computing system). For example, in some markets, users may wait for output messages (via market data feeds) before submitting responsive input messages. In other markets, users may plan to submit certain input messages regardless of, or independent of, market data information output from the exchange computing system. Thus, some markets may be reactionary (i.e., users typically wait for output messages, and submit input messages after consuming output messages), and some markets may be non-reactionary.

An exchange computing system may only implement one transaction processor (e.g., match engine) for each market. Thus, each transaction processor may be characterized as reactionary or non-reactionary.

Thus, in reactionary markets, market participants' strategies, such as when to submit a specific transaction to the exchange computing system to buy or sell a quantity of a financial instrument at a price, may depend heavily on the state of the electronic marketplace, or on the information available about the electronic marketplace, e.g., published by the exchange computing system via a market data feed, at or near the time the transaction is generated and submitted by the user.

Some reactionary market strategies (defined, for example, in part by the messages submitted by the user in relation to market data timing), may be highly dependent on the state of the electronic marketplace. In other words, the value of the strategy may be very sensitive to changes in the overall electronic marketplace. For example, if the state of a data object representing the electronic order book drastically changes, a user's strategy may become less valuable. In this type of market, the market data feed, and the bandwidth associated therewith, may be critical for the users.

The disclosed resource allocation system analyzes input output message characteristics to attribute an overall characteristic for a market (and therefore, its associated matching transaction processor) as described herein. The resource allocation system allocates computing resources to different transaction processors based on the classification.

The resource allocation system analyzes incoming messages, including the latency associated with processing each message. In one embodiment, the resource allocation system computes a moving average latency delta for each received message. For example, FIG. 5A illustrates table 500 including data associated with received (incoming) messages M1, M2, M3, M4 and M5 in column 502, which are received sequentially in the listed order. The latency experienced by each message is listed in column 504. The latency experienced by each message may be defined as the amount of time that passes between the exchange computing system match engine receiving a message and publishing a response (e.g., via a market data feed) based on the received message. For example, the latency associated with incoming message M1 may include the amount of time required to receive M1, process M1, and publish an output message reporting on the effects of M1.

It should be appreciated that the actual latency of messages, in many cases, is not a good indicator of the load or message density being experienced by a match engine. For example, information about whether a message experiences 8 microseconds of latency versus 9 microseconds of latency, without additional information, is not very useful. However, information about the change in latency over continuous messages can indicate that the match engine is experiencing a change in message density. Thus, the resource allocation system computes a delta value from previous information (i.e., column 506).

The difference in latency from the previously received message is listed in column 506. As shown in FIG. 5A, the delta value in column 506 is the change in latency between two sequentially received messages. For instance, because the latency of message M1 is 8 microseconds and the latency of message M2 is 9 microseconds, the delta value from previous associated with message M2 is 1 microsecond. Similarly, because the latency of message M3 is 14 microseconds and the latency of message M4 is also 14 microseconds, the delta value from previous associated with message M4 is 0 microseconds. And, because the latency of message M5 is 6 microseconds and the latency of message M6 is 4 microseconds, the delta value from previous associated with message M6 is -2 microseconds. The information in column 506 is useful because it reflects the difference in latency being experienced by sequential messages received and processed by the exchange computing system. The latency delta value may be a good proxy for message density. Yet simply counting input messages to determine density may not by statistically valuable.

As noted above, the absolute magnitude of the latency being experienced by the match engine may not be important. It is the change in latency over sequential messages that indicates a state of the match engine. Moreover, even the magnitude of the change in latency is not an important indicator, and thus should be minimized or translated into some other key value, if possible, from the resource allocation system computations. For example, if a latency between a pair of subsequent messages jumps from 8 microseconds to 50 microseconds (a change of 42 microseconds), and a latency between another pair of subsequent messages jumps from 8 microseconds to 11 microseconds (a change of 3 microseconds), the actual magnitude of the increase does not provide too much useful information about the state of the match engine. The 42 microsecond jump may be due to a fill event (or a trade event) which depends more on the state of the order book, the contents of the message that is actually matched, and the pending orders available to match with a received message. The large jump of 42 microseconds may not actually be related to the volume of incoming messages at a given moment in time.

Thus, match engines experience a wide range of incoming message volume throughout the trading day. The number of messages received at a given moment in time cannot typically be used to understand the number of messages received at some later time (unless, as described herein, the messages received are very close in time to each other). Similarly, match engines also experience a wide range of latencies, and the trading environment is dynamic and can change quickly. Information (e.g., actual latency experienced by a given message, message volume or density) about messages received at 9:30 a.m. may be completely irrelevant to information about messages being received at 9:45 a.m. Yet the system needs to compare groups of messages to detect important events and trends.

Thus, the resource allocation system also computes a trinary impact of the delta value, listed in column 508. Column 508 may also be said to be a directional change value assigned to each message based on whether the message's latency increased, decreased, or stayed the same, as compared to the previous message. For an increase in latency between subsequent messages (i.e., a positive number in column 508), the resource allocation system assigns a directional change value of 1 to the later of the two messages. If the latency remains the same between subsequent messages (i.e., a zero in column 508), the resource allocation system assigns a directional change value of 0 to the later of the two messages. And, if the latency between subsequent messages decreases (i.e., a negative number in column 508), the resource allocation system assigns a directional change value of negative 1, or −1, to the later of the two messages.

The resource allocation system then computes a moving average impact number which may average the impact number or directional change number (i.e., the column 508 number) for a preconfigured number (e.g., 3) of messages, as shown in column 510. The calculation may be a rolling window calculation as each message's impact value is computed. Thus, within a first window ending at message M4, the impact value for messages M2 through M4 may be averaged, to obtain ⅔ (1 plus 1 plus 0, divided by 3). Within a second window ending at message M5, when message M5 is received, the resource allocation system may compute the moving average from M3 to M5 to obtain 0 (1 plus 0 minus 1, divided by 3). Within a third window ending at message M6, when message M6 is received, the resource allocation system may compute the moving average from M4 to M6 to obtain negative ⅔, or −⅔ (0 minus 1 minus 1, divided by 3). The change in moving values may be tracked. Thus, the resource allocation system in one example embodiment computes that the moving average changes from a moving average of ⅔, to 0, to −⅔, as messages M4, M5 and M6 are received, respectively.

Figure 5B:
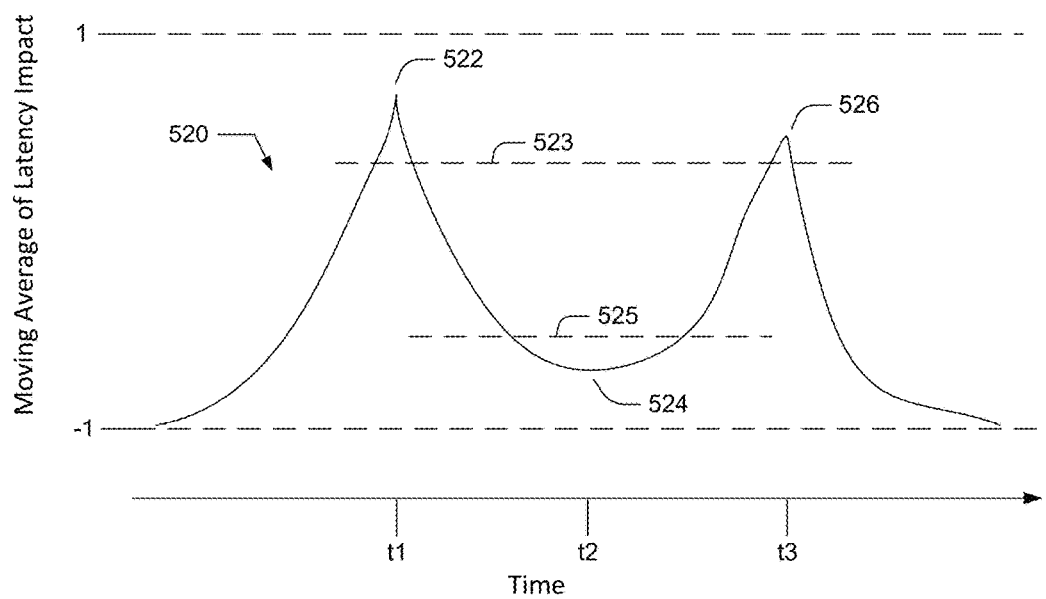
FIG. 5B illustrates an example moving average value curve.

FIG. 5B illustrates an example curve 520 of a moving average of the impact value for incoming messages for a transaction processor, i.e., messages received for a specific market implementing one match engine, or a transaction processor. Input message curve 520 may be derived from data associated with messages received by a match engine module, such as the match engine module 106 described in connection with FIGS. 4B to 4E. As shown in FIG. 5B, curve 520 includes peaks or local maxima 522 and 526, and trough or local minimum 524. The resource allocation system may compute that the peaks occurred at time t=t1 and time t=t3, and that the trough occurred at time t=t2. It should be appreciated that the moving average of impact value may oscillate between the boundaries of 1 and −1, based on the scale implemented and described in connection with, for example, column 510.

The resource allocation may identify the peaks or local maximums 522 and 526 based on upper threshold 523. In other words, resource allocation system may identify any value that is above the upper threshold 523 that peaks, or has a higher value than values before and after that value, and designate that value as a local maximum. The value of the upper threshold 523, and how a peak is identified (e.g., greater than 10 values before and after the peak) may be implementation specific. The resource allocation system may similarly identify trough, or local minimum value, 524, based on a lower threshold 525.

The resource allocation system may also determine when output messages responsive to received messages are published by the exchange computing system. For example, the resource allocation system may use the latency associated with an incoming message to determine when the first output message response to that incoming message was published. For example, referring to FIG. 5A, if message M4 is received at time t=t1, then the first output message responsive to message M1 is published at time t1 plus 14 microseconds. In other words, once the resource allocation system has incoming time of message and message latency, the resource allocation system can compute when the first output message responsive to an incoming message was published.

The resource allocation system, in one embodiment, computes times for all output messages associated with incoming messages. Thus, the resource allocation system uses incoming time of each received message plus that message's actual latency to compute time of publishing an output message responsive to each incoming message.

FIG. 5C illustrates a curve 530 for explanatory purposes to visualize the times when output messages are published by the exchange computing system. For convenience, curve 530 is illustrated on the same set of axes as curve 520 in FIG. 5C. As shown in FIG. 5C, curve 530 includes peaks or local maxima 532 and 536, and trough or local minimum 534. Output message curve 530 may be derived from data associated with messages published by a match engine module, such as the match engine module 106 described in connection with FIGS. 4B to 4E.

The resource allocation system computes and associates input-output message pairs. The first output for each input is calculated. Thus, high volume input activity, indicated by peak 522 on curve 520, is eventually followed by high volume output activity, indicated by peak 532 on curve 530. Similarly, trough 524 is eventually followed by corresponding output trough 534, and peak 526 is eventually followed by corresponding output peak 536. In particular, the output curve 530 retains the same overall y-axis shape as curve 520, except that the x-axis may be compressed or stretched out, depending on the actual latencies experienced by the input messages. For example, peak 522 may be located at time t1 because the last message in the peak 522 rolling window, e.g., message M20, may have been received at time t1. The latency experienced by message M20 may be 50 microseconds. Time t1 plus 50 microseconds may be time t3. Thus, the output message peak 532 corresponding to input message peak 522 may be plotted at time t3. Because there is another input message peak 526 at or near t3 (which is when output message peak 532 was published back to the users), the resource allocation system may determine that peak 526 is responsive to peak 532, and therefore may accordingly conclude that the transaction processor associated with curves 520 and 530 is a reactionary system.

In other words, because the resource allocation system detects that a new, second input peak 526 occurs at the same time (or closely thereafter, as discussed below) as output peak 532 (which is responsive to first input peak 522), the resource allocation system concludes that the second input peak 526 is responsive to output peak 532. Box or window 537 visually demonstrates how resource allocation system may compute that peak 526 corresponds, e.g., in time, or temporally, with peak 532. Window 537 includes left edge 538 and right edge 539 separated by width 527. The value of width 527 may be configurable, e.g., by a user or administrator of the exchange computing system. As shown in FIG. 5C, peak 526 falls within box 537, i.e., peak 526 occurs between left and right edges 538 and 539. Left edge 538 again coincides with or is placed or located at same x-axis location as peak 532. Thus, the resource allocation system computes or concludes that peak 526 temporally corresponds to peak 532, because peak 526 occurs within a predefined window of time after peak 532 occurs.

It should be appreciated that while output peak 532 is actually responsive to input peak 522, the transaction processor cannot know for sure why traders submitted the messages associated with input peak 526. However, based on the fact that a trough 524 preceded peak 526, and that peak 532 and peak 526 are so close in time (e.g., peak 526 is within box 537), the resource allocation system may be configured to identify such a pattern (namely, input peak 522 followed by input trough 524 followed by input peak 526 which corresponds in time to output peak 532) and conclude that the market for the transaction processor associated with curves 520 and 530 is reactionary, i.e., traders wait for responses to their orders (i.e., peak 532) before submitting additional orders (i.e., peak 526).

The resource allocation system may thus be configured to detect peak-trough-peak patterns for a moving average latency impact for input messages, and also be configured to detect an output peak that corresponds to the second input peak.

The resource allocation system may keep track of which customers sent which messages, so that the classification may be based on whether the second input peak (e.g., peak 526) was sent by the same or different customers as the first input peak (e.g., peak 522). In one embodiment, the resource allocation system concludes that the system is reactionary only if a specific percentage of customers in the second peak also submitted messages in the first peak.

It should be understood that by normalizing the moving average of latency impact, the resource allocation system can establish meaningful thresholds to detect peaks and troughs for messages. For example, if the thresholds for peaks and troughs are very low, an input data stream may result in the resource allocation system determining hundreds of input peaks and troughs for a day of trading data. If the thresholds are for peaks and troughs are very high, an input data stream may result in the resource allocation system determining very few input peaks and troughs for a day of trading data. Thus, the resource allocation system may be configurable, on a per transaction processor basis, to meaningful thresholds of peaks and troughs. The thresholds may be different for each transaction processor, and an administrator of a futures exchange such as the CME may establish, and modify/update, the thresholds that result in the resource allocation system determining and identifying peaks and valleys for a given market.

Whether an output peak, such as 532, corresponds with an input peak, such as 526, may also be configurable. In particular, the resource allocation system may be programmed or configured to detect or identify a second input peak 526 as corresponding to output peak 532 if peak 526 occurs within a configurable amount of time of peak 532. In an extremely fast environment such as a futures exchange which receive may receive thousands of messages per second, a 5 second difference between output peak 532 and input peak 526 may be too long to reasonable correlate peak 526 to peak 532. Of course, an input peak 526 that occurs even a millisecond before output peak 532 cannot be said to be responsive to output peak 532. Thus, the amount of time that can elapse between output peak 532 and second input peak 526 may be market (or processor) specific and may be best configured by an administrator experienced with the market (or processor).

If the specified pattern does not occur, the resource allocation system may conclude that the transaction processor is not a reaction based, or reaction driven, market. For example, FIG. 5D illustrates input curve 520 and corresponding output curve 540 on the same set of axes. Curve 540 includes peaks or local maxima 542 and 546, and trough or local minimum 544. Output peak 542 corresponds to input peak 522, output trough 542 corresponds to input trough 524, and output peak 546 corresponds to input peak 526.

As shown in FIG. 5D, output peak 542 occurs after second input peak 526. Moreover, there is no other input peak that occurs at the same time or after the time of output peak. Thus, the market (and transaction processor) associated with the curves in FIG. 5D can be said to be non-reactionary, or a market in which the outputs do not drive the inputs.

The resource allocation system accordingly concludes that a transaction processor is a reactionary processor based on the peaks and troughs occurring in the input data stream, and the corresponding peaks and troughs occurring in the output data stream. The resource allocation system is extremely configurable to offer user flexibility, such as, for example, configuration for: the values that correspond to peaks and troughs (for example, so only significant market activity is identified and analyzed); the pattern that is detected and searched for (e.g., how many instances of input and/or output peaks and/or troughs should occur before concluding that a transaction processor is a reaction-based system); and how much time after an output event (e.g., an output peak) can an input event (e.g., an input peak) occur such that the input event will be deemed responsive to the output event.

Moreover, the resource allocation system may be configured to analyze historical data, e.g., at the end of a trading day or week. Thus, the system may be implemented to analyze past data to control and optimize future resource allocation for the analyzed transaction processors. Or, the resource allocation system may be configured to analyze data in real-time, e.g., mid-day, and dynamically allocate resources based on current and recent (e.g., within a configurable time frame, e.g., 1 hour) transaction processor input output message pattern and activity.

The resource allocation system may classify all of the transaction processors within an exchange computing system. For example, in an exchange computing system including 19 different markets (e.g., 19 different match engines or transaction processors), the resource allocation system may analyze input output message patterns are described herein and classify each of the 19 processors as being reactionary (e.g., inputs driven by outputs to previous inputs) or non-reactionary (e.g., inputs not driven by outputs to previous inputs).

It should be understood that the curves 520, 530 and 540 associated with input output messages are only illustrated in the application for explanatory purposes. The resource allocation system typically does not need to plot the computed data, and can classify transaction processors and allocate resources based on the disclosed computations and rules. The resource allocation system may however, in one embodiment, include an image capture device (e.g., a digital camera, or a computer or tablet device including a camera) and plot the graphs on a display device, capture images of the plots, and use image detection or pattern detection logic to classify the match engines that produced the analyzed plots.

The classification associated with a transaction processor may be periodically evaluated. Alternatively, the classification may be permanent, or fixed for a long period of time. In one implementation, each transaction processor or match engine may be classified at the end of each trading day. The characterization may be dynamic, such that it can change. Thus, a match engine characterized as being reactionary at one point in time, may, at a different point in time, be characterized as being non-reactionary.

In one embodiment, the resource allocation system may be configured to look for a specific pattern associated with a series of alternating peaks and troughs. For example, the resource allocation system may be configured to detect a series of peaks and troughs similar to the patterns for curves 520 and 530 illustrated in FIG. 5C, but with more peaks and troughs. Thus, for example, if the resource allocation system detects 3 input peaks, and detects that output messages responsive to the input messages associated with the first peak correspond with input messages associated with the second peak, and that output messages responsive to the input messages associated with the second peak correspond with input messages associated with the third peak, then the resource allocation system may conclude that the associated match engine/transaction processor is reactionary. It should be appreciated that the more peak trough patterns where output messages responsive to the input messages associated with a peak correspond with input messages associated with a subsequent peak are detected, the more likely it is that the transaction processor processing the messages is reactionary.

In one embodiment, a second peak may not even be detected (e.g., because it does not exist). For example, referring to FIG. 5D, curve 520 may be modified so that peak 526 does not exist. Thus, the system may not detect a second peak of input messages at all, let alone a second peak whose associated input messages coincide with output messages responsive to previously received input messages. In such a case, the resource allocation system may conclude that the system is not reactionary.

In an alternative embodiment, the resource allocation system may plot information about input messages and associated output messages on an x-y plane including an x-axis representing time and a y-axis representing processing latency. The resource allocation system may only plot one output message for each input or received message, even though, as discussed above, one input message may generate or result in dozens, or even hundreds, of output messages. In particular, the resource allocation system may only plot the first output response of the exchange computing system.

The resource allocation system plots a first data point representing each incoming message along the x-axis based on the incoming time of the incoming message and along the y-axis based on the processing latency of the incoming message. The processing latency of a message may be defined as the difference between the time a message is received, and the time a first output message based on the input message is published. The resource allocation system also plots a second data point along the x-axis based on the publishing time of outgoing message corresponding to the incoming message and along the y-axis based on the processing latency of the corresponding incoming message.

For example, referring to FIG. 5E, data point 552, which represents an input message 551 (not shown) processed by the exchange computing system, is plotted on x-y plane 550 at an x-axis value of A and a y-axis value of B, because the message represented by data point 552 was received by the transaction processor at time A, and took B time to process.

An output message (553, not shown), which may be the first message responsive to processing 551, may be represented as data point 554. Data point 554 is plotted on x-y plane 550 at an x-axis value of C, and a y-axis value of B. Notably, the difference between A and C is B, which is the y-axis value for corresponding data point 552. In other words, data point 554's x-axis location is offset to the right of corresponding data point 552 (i.e., along the x-axis) by the y-axis value of corresponding data point 552. A horizontal line 556 may be plotted connecting input output pair 552 and 554. Horizontal line 556 has a length of B, equal to the y-axis location of points 552 and 554. This specific plotting rule may aid visualization, by a user or by a an image capture device implemented by the resource allocation system, in charactering the multiple transaction processors.

Data point 558 (representing another input message 557, not shown) is plotted on the x-y plane 550 at an x-axis value of C, and a y-axis value of D, because the message 557 represented by data point 558 was received by the transaction processor at time C, and took D time to process.

An output message (559, not shown), which may be the first message responsive to processing 557, may be represented as data point 560. Data point 560 is plotted on x-y plane 550 at an x-axis value of E, and a y-axis value of D. Notably, the difference between C and E is D, which is the y-axis value for corresponding data point 558. In other words, data point 560's x-axis location is offset to the right of corresponding data point 558 (i.e., along the x-axis) by the y-axis value of corresponding data point 558. A horizontal line 562 may be plotted connecting input output pair 558 and 560. Horizontal line 562 has a length of D, equal to the y-axis location of points 558 and 560.

For a given transaction processor, the resource allocation system may plot all input messages received by the transaction processor, and the first corresponding output message published by the transaction processor, using the disclosed message plotting rules.

FIG. 5F illustrates an example plot 570 including multiple pairs of input output data points representing input and output messages received and published, respectively, by a transaction processor according to the disclosed message plotting rules. Plot 570 may be an example plot for the input-output message pattern, plotted according to the disclosed plotting rules, for a reactionary system. Peak 572 is an input peak, e.g., similar to peak 522 in FIG. 5C. Peak 574 is an output peak, e.g., similar to peak 532 in FIG. 5C. And peak 576 is an input peak, similar to peak 526 in FIG. 5C. Box 578, like box 537, is placed or visually demonstrated as being located so that its left edge coincides with peak 574. Because second input peak 576 is located within box 578, the resource allocation system, or a user implementing the resource allocation system, may conclude that the match engine associated with the messages used to generate the data points in plot 570 is a reactionary system, and may re-allocate computing resources based on that classification or characterization.

FIG. 5G illustrates an example plot 580 including multiple pairs of input output data points representing input and output messages received and published, respectively, by a transaction processor according to the disclosed message plotting rules. Plot 580 may be an example plot for the input-output message pattern, plotted according to the disclosed plotting rules, for a non-reactionary system. Peak 582 is an input peak, e.g., similar to peak 522 in FIG. 5C. Peak 584 is an output peak, e.g., similar to peak 532 in FIG. 5C. As shown in FIG. 5G, there is no input peak that coincides with, or corresponds, e.g., in time, with output peak 584. The resource allocation system, or a user implementing the resource allocation system, may conclude that the match engine associated with the messages used to generate the data points in plot 580 is a non-reactionary system, and may re-allocate computing resources based on that classification or characterization.

The resource allocation system, in one embodiment, generates one plot for each of multiple transaction processors, and characterize each transaction processor based on its plot. The resource allocation system then allocates resources to each transaction processor based on its characterization.

Upon classifying a transaction processor as reactionary or non-reactionary, the resource allocation system optimizes resource allocation based on the classification. The reallocation may be limited to reallocating resources used by any one transaction processor (e.g., input vs. output resource allocation for one transaction processor), or the reallocation may be for reallocating resources used by more than one or all of the transaction processors.

It should be understood that the amount of resources allocated to a transaction processor, as well as related input-output structures, affects how quickly that transaction processor can receive, process, and publish data. For instance, the amount of bandwidth dedicated to input messages affects how quickly a transaction processor can receive messages. The amount of bandwidth dedicated to market data feeds for a transaction processor affects how quickly the transaction processor can publish (e.g., output) information back to traders about match engine/transaction processor activity.

For example, the input bandwidth associated with a transaction processor controls how much data, or how many messages, over a unit of time, e.g., microsecond, can be received by the transaction processor. The output bandwidth associated with a transaction processor controls how much data, or how many messages, over a unit of time, e.g., microsecond, can be transmitted or published by the transaction processor.

Moreover, referring to FIG. 4A, the amount of processing power or cores (or CPU cycles) associated with the conversion component 402 affects how quickly messages can be processed, e.g., matched. In particular, the conversion component affects how quickly messages can be received by the match engine module, because messages are converted to a format that the match component can read. And, the amount of processing power or cores (or CPU cycles) associated with the publish component 410 affects how quickly output messages can be published via market data feeds.

As discussed above, in a reactionary system, users wait for system feedback (e.g., market data via market data feeds) before submitting additional orders. Thus, the ability to publish messages quickly is very important in reactionary systems. In non-reactionary systems, it may become more important to receive and process incoming messages than to publish responsive outgoing messages.

The resource allocation system accordingly allocates more resources towards generating and publishing output messages for reactionary systems. For examples, the resource allocation system may allocate more resources towards the match component and the publish component for a reactionary system. In contrast, because the matching and publishing times may not be critical (or as critical as the receiving/conversion components) in a non-reactionary system, a resource allocation system may allocate fewer resources towards the matching and publishing components and structures (including outgoing message bandwidth) in a non-reactionary system than in a reactionary system.

The resource allocation system may reallocate resources amongst inputs and outputs of multiple transaction processors, or may reallocate resources amongst one the input and output of one transaction processor. The reallocation that can be performed may depend on how the computing resources are configured to work with the various transaction processors.

It should be appreciated that the amount of time needed for the exchange system to respond to an order submission or message can vary depending on the messaging load or the number of orders being processed or matched at any given time. In other words, the transaction processing system cannot respond to new messages quickly if it is still processing or matching other messages, or publishing output messages to previously received messages. Market activity can be volatile and drastically change in a very short amount of time, e.g., a few microseconds or even nanoseconds. If more time is needed to process an order, or publish a response, the risk for the market participant increases. In other words, if the match engine load is high, there may be a risk that a market participant may not be able to secure a price level that was observed to be available, e.g., via a market data feed published to the users.

Moreover, orders in the match engine module are processed sequentially based on the time they were received. Order acknowledgements and other resulting messages are published sequentially in the order they are received by the publish component. Thus, incoming messages may experience a large, unpredictable delay due to previously received messages. Thus, the time that a customer receives an acknowledgment that an order entered the match component depends upon the activity in the match component, as well as how many messages currently exist in the pre-match and/or post-match queue. During times of heavy volume and processing, a market participant may experience a long response time just to receive an acknowledgement that his or her message entered the match component, because the acknowledgement may be behind several other messages in the transaction processing system. Thus, a market participant may face risks and uncertainty due to extended response times, for acknowledgments as well or match confirmations or fills. Moreover, a message may experience a high delay between being received by the exchange computing system and being processed, i.e., considered for matching, by the exchange computing system.

By reallocating computing hardware and software resources, the disclosed embodiments optimize or tailor the use of available, finite resources for each transaction processor.

Figure 6A:
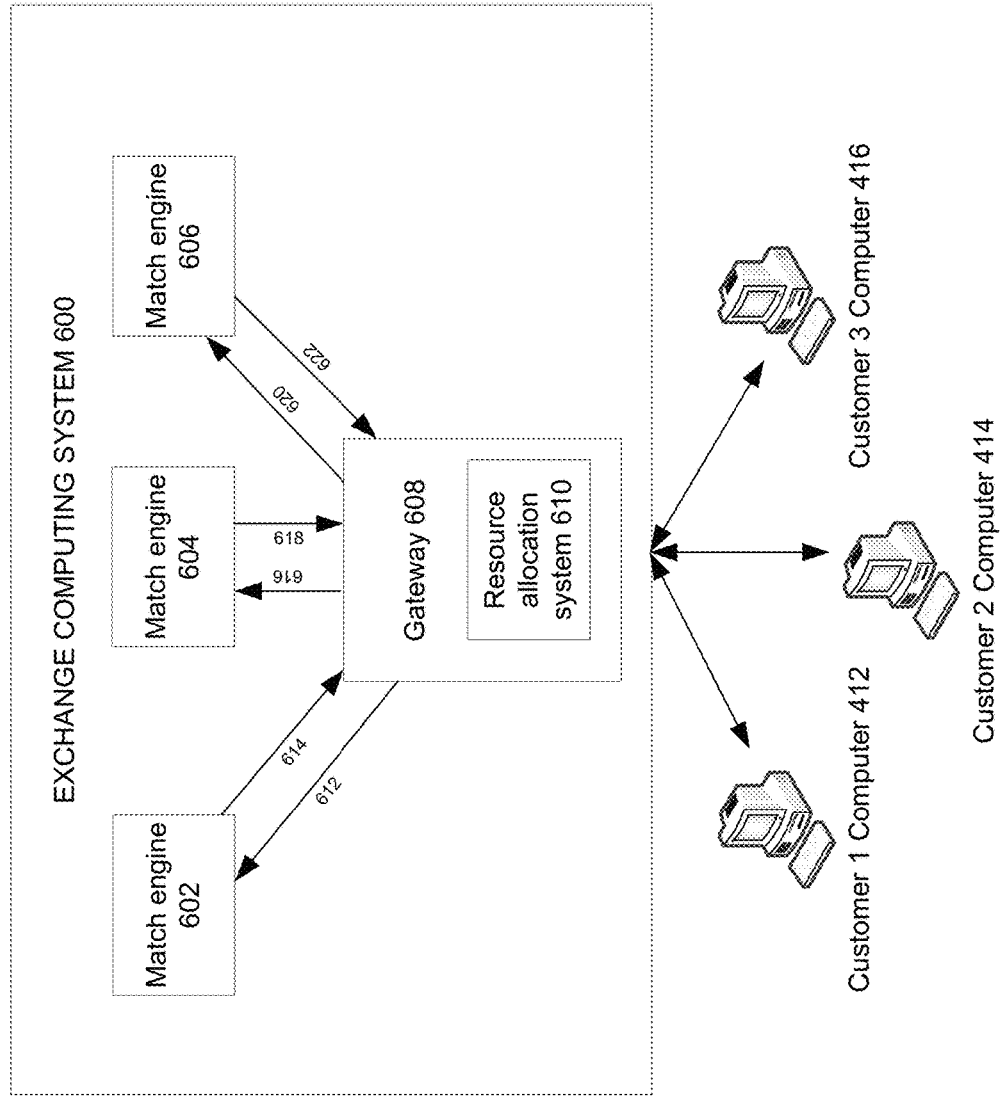
FIG. 6A illustrates an example exchange computing system including multiple match engines and a convenience gateway.

FIG. 6A illustrates an example implementation of an exchange computing system 600 including multiple match engines 602, 604 and 606. Exchange computing system 600 may be similar to exchange computing system 100 described in connection with FIG. 1. Exchange computing system 600 includes a convenience gateway 608. Gateway 608 includes resource allocation system 610 for allocating various resources to match engines 602, 604 and 606. Gateway 608 is considered to be a convenience gateway because it connects to each match engine via input and output data connections, so that traders can submit messages, regardless of which match engine the messages should be processed on, directly to the convenience gateway 608.

Although only three match engines are illustrated in example FIG. 6A, the exchange computing system may include more than three transaction processors or match engines.

Convenience gateway 608 routes data to and from match engine 602 via input path 612 (from gateway 608 to match engine 602) and output path 614 (from match engine 602 to gateway 608), respectively. Convenience gateway 608 routes data to and from match engine 604 via input path 616 (from gateway 608 to match engine 604) and output path 618 (from match engine 604 to gateway 608), respectively. Convenience gateway 608 routes data to and from match engine 606 via input path 620 (from gateway 608 to match engine 606) and output path 622 (from match engine 606 to gateway 608), respectively. For example, gateway 608 receives input messages from customer computers 412, 414 and 416. Each message may be intended for one of the match engines 602, 604 or 606. Or, a message may be configured to be matched by any one of the match engines. Gateway 608 also receives output messages from the match engines that is then disseminated to the customers.

Each match engine is a transaction processor that can be characterized as being reactionary, or non-reactionary. Upon classifying match engines 602, 604, and 606, resource allocation system 610 may allocate bandwidth resources among paths 612, 614, 616, 618, 620, and 622 based upon the classifications. For example, resource allocation system 610 may analyze the input output message patterns for each transaction processor, or match engine, as described herein. The resource allocation system 610 may conclude, based on the input output message patterns for each match engine, that match engines 602 and 606 are reactionary, but that match engine 604 is non-reactionary. Thus, as discussed herein, paths 614 and 622 are more important to match engines 602 and 606, respectively (or to users of match engines 602 and 606, respectively), than path 618 is to match engine 604. The resource allocation system 610 may accordingly allocate resources from path 618 to paths 614 and 622.

In one embodiment, gateway 608 is configured to serially poll, or listen to, each data path in order. For example, gateway 608 may activate, or poll, each of paths 612, 614, 616, 618, 620 and 622 serially, for 30 microseconds at a time. Thus, when path 612 is activated, or is being polled, by gateway 608, gateway 608 spends 30 microseconds sending input messages to match engine 602. After 30 microseconds, gateway 608 begins polling path 614, and accordingly spends 30 microseconds receiving output messages from match engine 602. Gateway 608 similarly serially polls each path until path 622. After path 622's 30 microseconds are finished, gateway 608 returns back to path 612 and continues polling all of the data paths in a continuous loop, listening to or activating each path for 30 microseconds at a time.

To allocate resources from path 618 to paths 614 and 622, the resource allocation system 610 may reconfigure gateway 608 to spend more time polling paths 614 and 622. Paths 614 and 622 may be activated for 40 microseconds each, and path 618 may only be activated for 10 microseconds. In other words, 20 microseconds of gateway 608 time typically dedicated for path 618 are reallocated to paths 614 and 622.

In one embodiment, gateway 608 may be configured to communicate with all match engines over all paths at the same time, with data packets being sent by and received by gateway 608 as quickly as possible. The gateway 608 may have the ability to assign quality of service levels, or priority levels, to the different paths. In this case, the resource allocation system 610 may reallocate resources among the data paths by modifying the quality of service level for packets from certain data paths. For instance, resource allocation system 610 may reconfigure gateway 608 to allocate resources from path 618 to paths 614 and 622 by prioritizing data packets received via paths 614 and 622 over data packets received via path 618. For example, if data is received by gateway 608 from both match engine 602 (via path 614) and match engine 604 (via path 618) at the same time, but resource allocation system 610 has prioritized path 614 over path 618 (because match engine 602 is reactionary, but match engine 604 is non-reactionary), then the quality of service assigned to path 614 will be higher than the quality of service assigned to path 618. Thus, data packets from path 614 will be received and processed by gateway 608 ahead of data packets from path 618.

It should be appreciated that prioritizing one path over another path is a way to reallocate computing resources among the paths. Windows Server 2003 Quality of Service (QoS) is an example implementation of quality of service prioritization to differentiate traffic flows so that higher-priority traffic receives preferential treatment. Another example implementation of QoS in a network environment is provided by the IEEE P802.1p task group, which suggests the use of 8 different classes of services (i.e., priority levels) to treat different types of traffic, where a priority level from 0 to 7 is assigned to each network frame. A service or priority level of 0 receives the lowest priority, and a service or priority level of 7 receives the highest priority. The service level assigned to a code within a packet or frame is used to differentiate network traffic, such as, for example, path 614 versus path 618.

Figure 6B:
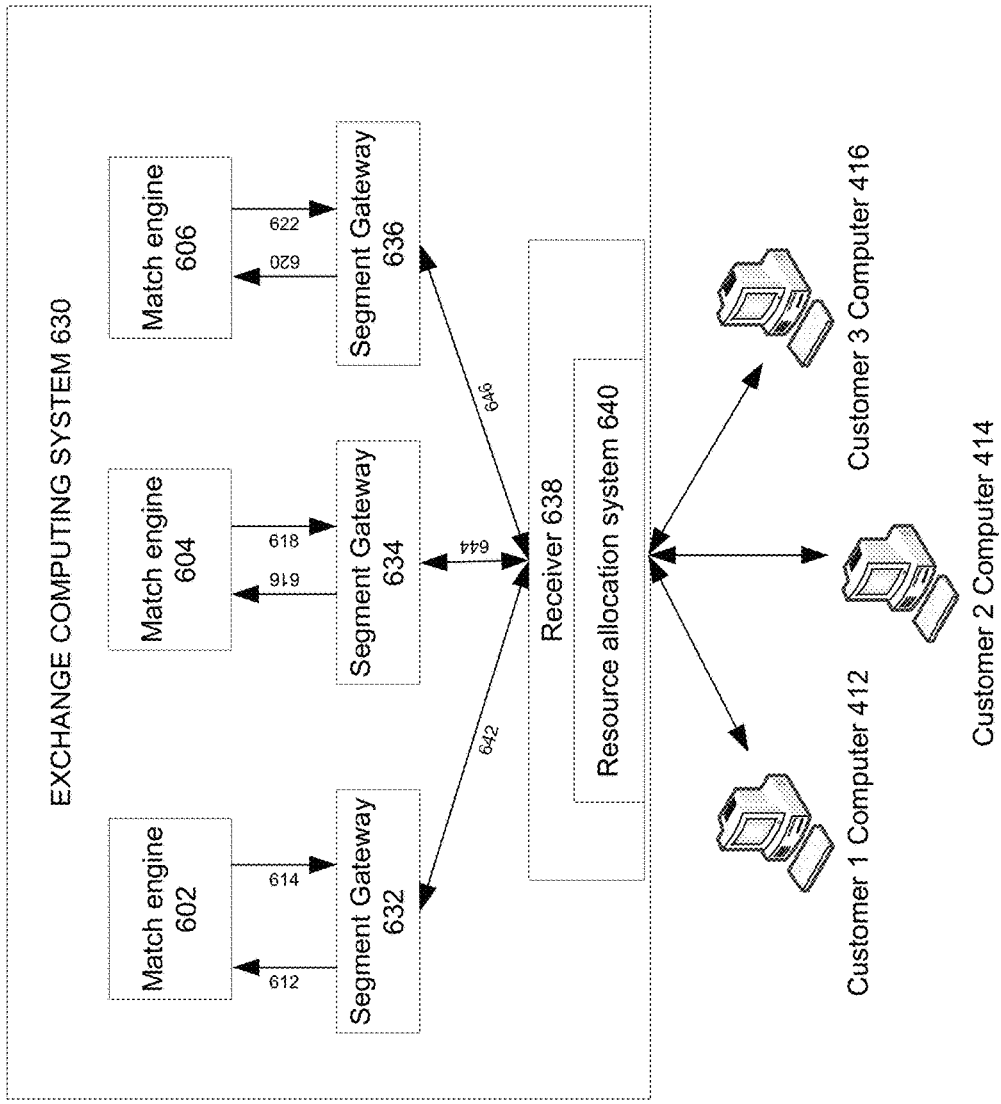
FIG. 6B illustrates an example exchange computing system including multiple match engines and multiple segment gateways.

In one embodiment, the exchange computing system may include segment gateways specific to each match engine, or transaction processor. Customers wishing to trade on a given match engine (e.g., because they want to trade financial instruments that are processed by that match engine) initiate a session with the segment gateway associated with that match engine. FIG. 6B illustrates an example exchange computing system 630 that, like exchange computing system 600, includes multiple match engines 602, 604 and 606. Exchange computing system 630 includes segment gateways 632, 634, and 636, each of which is in data communication with match engines 602, 604, and 606, respectively.

Segment gateway 632 routes data to and from match engine 602 via input path 612 (from gateway 632 to match engine 602) and output path 614 (from match engine 602 to gateway 632), respectively. Segment gateway 634 routes data to and from match engine 604 via input path 616 (from gateway 634 to match engine 604) and output path 618 (from match engine 604 to gateway 634), respectively. Segment gateway 636 routes data to and from match engine 606 via input path 620 (from gateway 636 to match engine 606) and output path 622 (from match engine 606 to gateway 636), respectively. Each segment gateway may be in data communication with a receiver 638 including resource allocation system 640 via data paths 642, 644, and 646 as shown. Receiver 638 communicates with customer computers 412, 414, and 416.

Like resource allocation system 610 in FIG. 6A, resource allocation system 640 in FIG. 6B may conclude, based on the input output message patterns for each match engine, that match engines 602 and 606 are reactionary, but that match engine 604 is non-reactionary. The resource allocation system accordingly may prioritize input path 616 over output path 618 associated with match engine 604. For example, the resource allocation may be defined as a percentage or ratio of available resources. For reactionary match engine 602, the resource allocation among the input and output paths may be evenly divided, e.g., 50% for path 612 and 50% for path 614, which may be expressed as a 1:1 ratio. Similarly, for reactionary match engine 606, the resource allocation among the input and output paths may also be evenly divided, e.g., 50% for path 620 and 50% for path 622. For non-reactionary match engine 604, the resource allocation among the input and output paths may be reallocated differently based on the classification that match engine 604 is non-reactionary, e.g., 75% for input path 616 and 25% for output path 618, which may be expressed as a 3:1 ratio.

The resource allocation system 640 may also be able to configure receiver 638 so that the distribution or allocation of resources among data paths 642, 644, and 646 is modified, i.e., reallocated, based on match engine classification. For example, resource allocation system 640 may configure receiver 638 similarly as described in connection with resource allocation system 610 configuring gateway 608 in FIG. 6A, based on match engine (or transaction processor) classification.

It should be appreciated that other network configurations, other than the configurations illustrated in FIGS. 6A and 6B, may also be implemented. For example, customer computers may communicate directly with the segment gateways, without going through receiver 638. The resource allocation system 640, in that case, may be in communication with each segment gateway, and may be able to reallocate resources between the input and the output for each match engine as described herein, e.g., by prioritizing an input data path over an output data path, for example.

In addition to managing the data paths coupling match engines to gateways, the disclosed resource allocation system may alternatively, or additionally, reallocate CPU resources among various components of the match engines 602, 604 and 606. For example, referring back to FIG. 4A, each match engine may be generally said to include components associated with receiving input messages, processing input messages, or publishing output messages based on the processing. For example, the conversion component 402 receives/converts messages so they can be processed by the match engine, the match component 406 matches or attempts to match the incoming messages, and the publish component 410 publishes outgoing messages back to customers, e.g., via a data feed. Typically, a match engine module 106 is implemented on one physical device, e.g., a CPU. Thus, the components within the match engine module share a common set of CPU resources, such as the cores dedicated to a given task such as conversion, matching, or publishing. The cores or processing threads dedicated for a task controls the speed at which the task can be performed. A core is an independent processing unit (e.g., hardware) that reads and executes program instructions. A thread is a section of software code or program instructions being processed. A software application includes at least one processing thread. In a single-threaded program, the code is read in order, from beginning to end. A core typically handles one processing thread, although some cores handle multiple threads.

In one embodiment, the resource allocation system reallocates the amount of CPU resources, e.g., cores or processing threads, that are dedicated to one of the three described tasks or applications based upon match engine classification. For non-reactionary match engines, the publish component is less important than the conversion component. Accordingly, the resource allocation system may reallocate CPU resources from the publish component to the conversion component for a non-reactionary system.

In one embodiment, the resource allocation system allocates power resources to one computing component over another computing component, based upon transaction processor characterization or classification. Or, the resource allocation system reallocates cooling capacity, e.g., fans, towards one computing component or another computing component, based upon transaction processor characterization or classification.

Alternatively, or additionally, in one embodiment, the resource allocation system reallocates power resources from one transaction processor to another transaction processor, based upon transaction processor characterization or classification. Or, the resource allocation system reallocates cooling capacity, e.g., fans, from one transaction processor to another transaction processor, based upon transaction processor characterization or classification.

The resource allocation system may alternatively vary the amount of memory (e.g., random access memory) available to a component based upon transaction processor classification. Or, the resource allocation system may or the amount of cache storage available to a component based on the classification.

The resource allocation system may also dynamically allocate resources towards the match component, if a match engine module is suffering from high match component latency.

In one embodiment, the resource allocation system may modify the format of outgoing market data feeds (e.g., MBO versus MBP discussed above) based upon the match engine classification. Thus, a match engine may begin to publish data in a format that publishes faster (e.g., MBP) if the match engine is classified as a reactionary system.

In one embodiment, the resource allocation system reduces the frequency of market data updates for a match engine if the match engine is classified as a non-reactionary system.

The resource allocation system may also modify the type of matching algorithm implemented by a match engine based on whether the match engine is classified as a reactionary or a non-reactionary system. For example, in a non-reactionary system, the resource allocation system may direct or allocate resources away from the match component to the conversion component.

The resource allocation system may also allocate more overall resources to transaction processors during certain high performance, high activity periods. For instances, in a futures exchange implementation of the disclosed embodiments, a resource allocation system may allocate more resources to a transaction processor for an options market during a roll.

Figure 7:
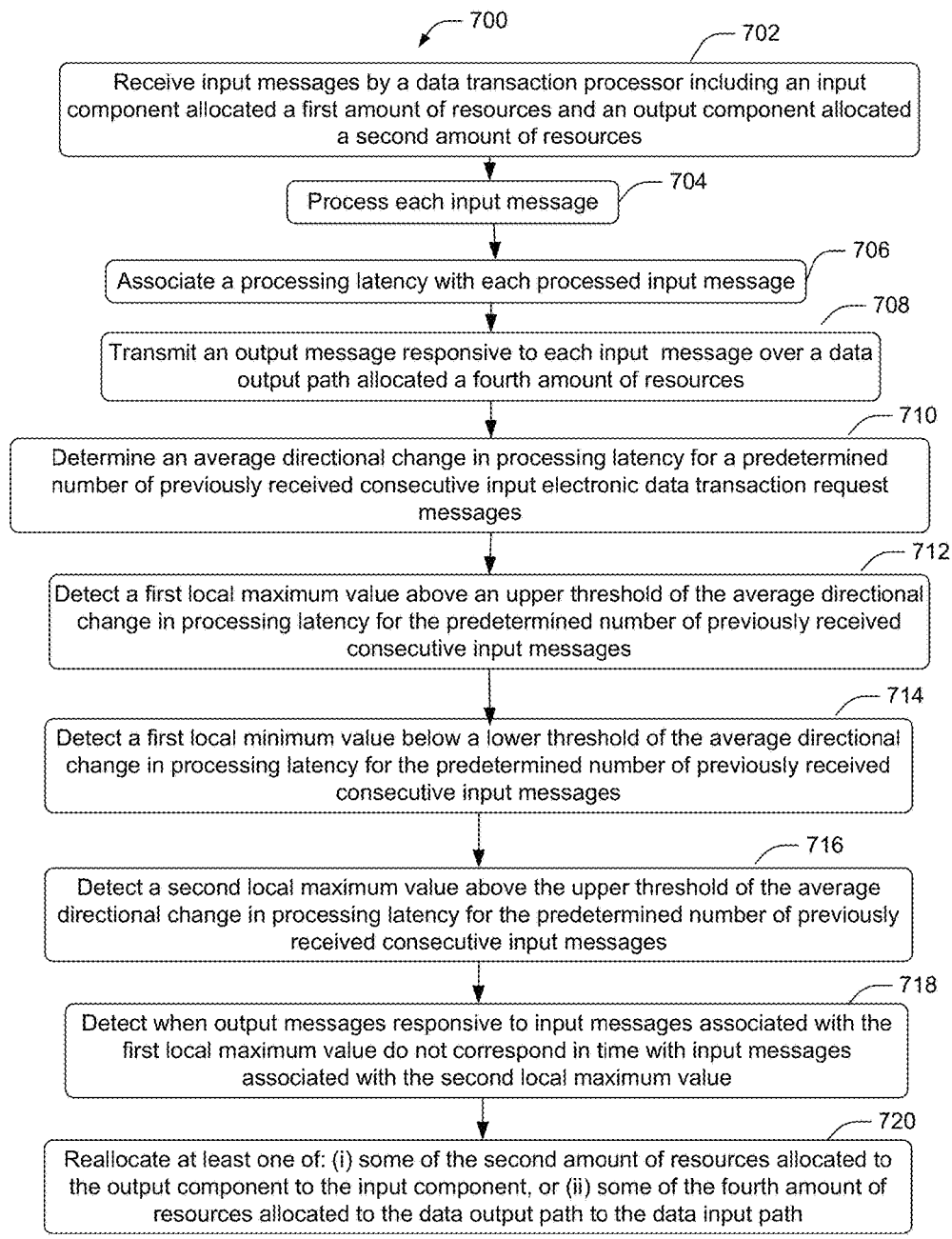
FIG. 7 depicts an example flowchart for implementing a resource allocation system in accordance with the disclosed embodiments.

FIG. 7 an illustrates an example flowchart 700 indicating an example method of implementing a resource allocation system, as may be implemented with computer devices and computer networks, such as those described with respect to FIGS. 1 and 2. Embodiments may involve all, more or fewer actions indicated by the blocks of FIG. 7. The actions may be performed in the order or sequence shown or in a different sequence. In one embodiment, the steps of FIG. 7 may be carried out by resource allocation module 150.

The method 700 includes receiving, by a data transaction processor including an input component allocated a first amount of resources and an output component allocated a second amount of resources, a plurality of input electronic data transaction request messages over a data input path allocated a third amount of resources, as shown in block 702. The data transaction processor may be a matching processor implemented by an exchange computing system. The method also includes processing, by the data transaction processor, each input electronic data transaction request message, as shown in block 704. Processing messages by the transaction processor may include matching or attempting to match each input message. If a match cannot be performed, then the message may rest on the order books.

The method includes associating a processing latency with each processed input electronic data transaction request message, as shown in block 706. It should be understood that the processing latency may depend on how long a match engine module takes to receive, convert/format, and attempt to match the input message.

The method includes transmitting, by the data transaction processor, an output electronic data transaction request message responsive to each input electronic data transaction request message over a data output path allocated a fourth amount of resources, as shown in block 708.

The method includes determining, by a reallocation processor, for each input electronic data transaction request message, an average directional change in processing latency for a predetermined number of previously received consecutive input electronic data transaction request messages of the plurality of input electronic data transaction request messages, as shown in block 710. For example, the method may include assigning a value of 1, 0, or −1 to a message if its latency, compared to the previous message, increased, stayed the same, or decreased, respectively.

The method includes detecting, by the reallocation processor, a first local maximum value above an upper threshold of the average directional change in processing latency for the predetermined number of previously received consecutive input electronic data transaction request messages, as shown in block 712. The threshold and predetermined number may be specified before the method is commenced, e.g., by a user or administrator of the exchange computing system. Predetermined as used herein means that the system has previously received information, or that it is previously determined, before the respective step.

The method also includes detecting, by the reallocation processor, a first local minimum value below a lower threshold of the average directional change in processing latency for the predetermined number of previously received consecutive input electronic data transaction request messages, the first local minimum value occurring after the first local maximum value, as shown in block 714.

The method also includes detecting, by the reallocation processor, a second local maximum value above the upper threshold of the average directional change in processing latency for the predetermined number of previously received consecutive input electronic data transaction request messages, the second local maximum value occurring after the first local minimum value, as shown in block 716. The method includes detecting, by the reallocation processor, when output electronic data transaction request messages responsive to input electronic data transaction request messages associated with the first local maximum value do not correspond in time with input electronic data transaction request messages associated with the second local maximum value, as shown in block 718.

The method 700 also includes, upon detecting that output electronic data transaction request messages responsive to the input electronic data transaction request messages associated with the first local maximum value do not correspond in time with input electronic data transaction request messages associated with the second local maximum value, reallocating, by the reallocation processor, at least one of: (i) some of the second amount of resources allocated to the output component to the input component, or (ii) some of the fourth amount of resources allocated to the data output path to the data input path, as shown in block 720.

In one exemplary embodiment, the disclosed resource allocation may be implemented within a computer system including: a first logic stored in a memory and executable by a data transaction processor including an input component allocated a first amount of resources and an output component allocated a second amount of resources to cause the data transaction processor to receive a plurality of input electronic data transaction request messages over a data input path allocated a third amount of resources; a second logic stored in the memory and executable by the data transaction processor to cause the data transaction processor to process each input electronic data transaction request message; a third logic stored in the memory and executable by a latency processor to associate a processing latency with each processed input electronic data transaction request message; a fourth logic stored in the memory and executable by the data transaction processor to cause the data transaction processor to transmit an output electronic data transaction request message responsive to each input electronic data transaction request message over a data output path allocated a fourth amount of resources; a fifth logic stored in the memory and executable by a reallocation processor to cause the reallocation processor to determine, for each input electronic data transaction request message, an average directional change in processing latency for a predetermined number of previously received consecutive input electronic data transaction request messages of the plurality of input electronic data transaction request messages; a sixth logic stored in the memory and executable by the reallocation processor to cause the reallocation processor to detect a first local maximum value above an upper threshold of the average directional change in processing latency for the predetermined number of previously received consecutive input electronic data transaction request messages; a seventh logic stored in the memory and executable by the reallocation processor to cause the reallocation processor to detect a first local minimum value below a lower threshold of the average directional change in processing latency for the predetermined number of previously received consecutive input electronic data transaction request messages, the first local minimum value occurring after the first local maximum value; an eighth logic stored in the memory and executable by the reallocation processor to cause the reallocation processor to detect a second local maximum value above the upper threshold of the average directional change in processing latency for the predetermined number of previously received consecutive input electronic data transaction request messages, the second local maximum value occurring after the first local minimum value; a ninth logic stored in the memory and executable by the reallocation processor to cause the reallocation processor to detect when output electronic data transaction request messages responsive to input electronic data transaction request messages associated with the first local maximum value do not correspond in time with input electronic data transaction request messages associated with the second local maximum value; and a tenth logic stored in the memory and executable by the reallocation processor to cause the reallocation processor to, upon detecting that output electronic data transaction request messages responsive to the input electronic data transaction request messages associated with the first local maximum value do not correspond in time with input electronic data transaction request messages associated with the second local maximum value, reallocate at least one of: (i) some of the second amount of resources allocated to the output component to the input component, or (ii) some of the fourth amount of resources allocated to the data output path to the data input path.

Referring back to FIG. 1, the trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring back to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer system comprising:
a first logic stored in a memory and executable by a data transaction processor including an input component allocated a first amount of resources and an output component allocated a second amount of resources to cause the data transaction processor to receive a plurality of input electronic data transaction request messages over a data input path allocated a third amount of resources;
a second logic stored in the memory and executable by the data transaction processor to cause the data transaction processor to process each input electronic data transaction request message;
a third logic stored in the memory and executable by a latency processor to associate a processing latency with each processed input electronic data transaction request message;
a fourth logic stored in the memory and executable by the data transaction processor to cause the data transaction processor to transmit an output electronic data transaction request message responsive to each input electronic data transaction request message over a data output path allocated a fourth amount of resources;
a fifth logic stored in the memory and executable by a reallocation processor to cause the reallocation processor to determine, for each input electronic data transaction request message, an average directional change in processing latency for a predetermined number of previously received consecutive input electronic data transaction request messages of the plurality of input electronic data transaction request messages;

a sixth logic stored in the memory and executable by the reallocation processor to cause the reallocation processor to detect a first local maximum value above an upper threshold of the average directional change in processing latency for the predetermined number of previously received consecutive input electronic data transaction request messages;

a seventh logic stored in the memory and executable by the reallocation processor to cause the reallocation processor to detect a first local minimum value below a lower threshold of the average directional change in processing latency for the predetermined number of previously received consecutive input electronic data transaction request messages, the first local minimum value occurring after the first local maximum value;

an eighth logic stored in the memory and executable by the reallocation processor to cause the reallocation processor to detect a second local maximum value above the upper threshold of the average directional change in processing latency for the predetermined number of previously received consecutive input electronic data transaction request messages, the second local maximum value occurring after the first local minimum value;

a ninth logic stored in the memory and executable by the reallocation processor to cause the reallocation processor to detect when output electronic data transaction request messages responsive to input electronic data transaction request messages associated with the first local maximum value do not correspond in time with input electronic data transaction request messages associated with the second local maximum value; and a tenth logic stored in the memory and executable by the reallocation processor to cause the reallocation processor to, upon detecting that output electronic data transaction request messages responsive to the input electronic data transaction request messages associated with the first local maximum value do not correspond in time with input electronic data transaction request messages associated with the second local maximum value, reallocate at least one of: (i) some of the second amount of resources allocated to the output component to the input component, or (ii) some of the fourth amount of resources allocated to the data output path to the data input path.

2. A computer implemented method comprising:

receiving, by a data transaction processor including an input component allocated a first amount of resources and an output component allocated a second amount of resources, a plurality of input electronic data transaction request messages over a data input path allocated a third amount of resources;

processing, by the data transaction processor, each input electronic data transaction request message;

associating a processing latency with each processed input electronic data transaction request message;

transmitting, by the data transaction processor, an output electronic data transaction request message responsive to each input electronic data transaction request message over a data output path allocated a fourth amount of resources;

determining, by a reallocation processor, for each input electronic data transaction request message, an average directional change in processing latency for a predetermined number of previously received consecutive input electronic data transaction request messages of the plurality of input electronic data transaction request messages;

detecting, by the reallocation processor, a first local maximum value above an upper threshold of the average directional change in processing latency for the predetermined number of previously received consecutive input electronic data transaction request messages;

detecting, by the reallocation processor, a first local minimum value below a lower threshold of the average directional change in processing latency for the predetermined number of previously received consecutive input electronic data transaction request messages, the first local minimum value occurring after the first local maximum value;

detecting, by the reallocation processor, a second local maximum value above the upper threshold of the average directional change in processing latency for the predetermined number of previously received consecutive input electronic data transaction request messages, the second local maximum value occurring after the first local minimum value;

detecting, by the reallocation processor, when output electronic data transaction request messages responsive to input electronic data transaction request messages associated with the first local maximum value do not correspond in time with input electronic data transaction request messages associated with the second local maximum value; and upon detecting that output electronic data transaction request messages responsive to the input electronic data transaction request messages associated with the first local maximum value do not correspond in time with input electronic data transaction request messages associated with the second local maximum value, reallocating, by the reallocation processor, at least one of: (i) some of the second amount of resources allocated to the output component to the input component, or (ii) some of the fourth amount of resources allocated to the data output path to the data input path.

3. The computer implemented method of claim 2, further comprising:

detecting, by the reallocation processor, when output electronic data transaction request messages responsive to input electronic data transaction request messages associated with the first local maximum value correspond in time with input electronic data transaction request messages associated with the second local maximum value; and upon detecting that output electronic data transaction request messages responsive to the input electronic data transaction request messages associated with the first local maximum value correspond in time with input electronic data transaction request messages associated with the second local maximum value, reallocating, by the reallocation processor, at least one of: (iii) some of the first amount of resources allocated to the input component to the output component, or (iv) some of the third amount of resources allocated to the data input path to the data output path.

4. The computer implemented method of claim 2, wherein a component or data path being allocated an amount of resources comprises the component or data path having access to or the right to use the corresponding resources.

5. The computer implemented method of claim 2, wherein resources allocated to the data input or output paths comprise data bandwidth, time of activation of the respective data path, or time of access by the respective data path to a central router controlling whether the respective data path is active; and
wherein resources allocated to an input or output component comprise processing cycles, processing threads, cores, or memory.

6. The computer implemented method of claim 2, wherein detecting that output electronic data transaction request messages responsive to input electronic data transaction request messages associated with the first local maximum value correspond in time with input electronic data transaction request messages associated with the second local maximum value comprises detecting that the input electronic data transaction request messages associated with the second local maximum value are received by the data transaction processor within a predetermined amount of time after the output electronic data transaction request messages responsive to input electronic data transaction request messages associated with the first local maximum value are transmitted by the data transaction processor.

7. The computer implemented method of claim 2, including processing electronic data transaction request messages by the data transaction processor sequentially in the order the electronic data transaction request messages are received by the data transaction processor.

8. The computer implemented method of claim 2, wherein the data transaction processor is a hardware matching processor that attempts to match electronic data transaction request messages with other electronic data transaction request messages counter thereto.

9. The computer implemented method of claim 8, wherein the input electronic data transaction request messages are received from different client computers over a data communication network, and wherein the output electronic data transaction request messages are transmitted to the client computers and are indicative of results of the attempts to match incoming electronic data transaction request messages.

10. The computer implemented method of claim 2, wherein the data transaction processor is a first data transaction processor, the input component is a first input component, the output component is a first output component, the plurality of input electronic data transaction request messages is a first plurality of input electronic data transaction request messages, the data input path is a first data input path, and the data output path is a first data output path, further comprising:
receiving, by a second data transaction processor including a second input component allocated a fifth amount of resources and a second output component allocated a sixth amount of resources, a second plurality of input electronic data transaction request messages over a second data input path allocated a seventh amount of resources;
processing, by the second data transaction processor, each input electronic data transaction request message from the second plurality of electronic data transaction request messages;
associating a processing latency with each processed input electronic data transaction request message of the second plurality of electronic data transaction request messages;
transmitting, by the second data transaction processor, an output electronic data transaction request message responsive to each input electronic data transaction request message of the second plurality of electronic data transaction request messages over a second data output path allocated an eighth amount of resources;
determining, by the reallocation processor, for each input electronic data transaction request message of the second plurality of electronic data transaction request messages, an average directional change in processing latency for a predetermined number of previously received consecutive input electronic data transaction request messages of the second plurality of input electronic data transaction request messages;
detecting, by the reallocation processor, a third local maximum value above an upper threshold of the average directional change in processing latency for the predetermined number of previously received consecutive input electronic data transaction request messages of the second plurality of electronic data transaction request messages;
detecting, by the reallocation processor, a second local minimum value below a lower threshold of the average directional change in processing latency for the predetermined number of previously received consecutive input electronic data transaction request messages of the second plurality of electronic data transaction request messages, the second local minimum value occurring after the third local maximum value;
detecting, by the reallocation processor, a fourth local maximum value above the upper threshold of the average directional change in processing latency for the predetermined number of previously received consecutive input electronic data transaction request messages of the second plurality of electronic data transaction request messages, the fourth local maximum value occurring after the third local minimum value;
detecting, by the reallocation processor, when output electronic data transaction request messages responsive to input electronic data transaction request messages associated with the third local maximum value do not correspond in time with input electronic data transaction request messages associated with the fourth local maximum value; and
upon detecting that output electronic data transaction request messages responsive to the input electronic data transaction request messages associated with the third local maximum value do not correspond in time with input electronic data transaction request messages associated with the fourth local maximum value, reallocating, by the reallocation processor, at least one of: (i) some of the sixth amount of resources allocated to the second output component to the second input component, or (ii) some of the eighth amount of resources allocated to the second data output path to the second data input path.

* * * * *